United States Patent
Amdahl (12) United States Patent (10) Patent No.: US 11,063,758 B1
(45) Date of Patent: Jul. 13, 2021

(54) METHODS FOR FACILITATING CIPHER SELECTION AND DEVICES THEREOF

(71) Applicant: F5 Networks, Inc., Seattle, WA (US)

(72) Inventor: Saxon Amdahl, Portola Valley, CA (US)

(73) Assignee: F5 NETWORKS, INC., Seattle, WA (US)

( * ) Notice: Subject to any disclaimer, the term of this patent is extended or adjusted under 35 U.S.C. 154(b) by 0 days.

(21) Appl. No.: 15/726,451

(22) Filed: Oct. 6, 2017

Related U.S. Application Data (60) Provisional application No. 62/415,607, filed on Nov. 1, 2016.

(51) Int. Cl.
*H04L 9/14* (2006.01)
*H04L 9/08* (2006.01)
(Continued)

(52) U.S. Cl.
CPC .............. *H04L 9/14* (2013.01); *G06F 3/0482* (2013.01); *G06F 21/602* (2013.01); *H04L 9/08* (2013.01);
(Continued)

(58) Field of Classification Search
CPC ......... H04L 9/14; H04L 9/08; H04L 63/0892; H04L 63/166; H04L 63/0272;
(Continued)

(56) References Cited

U.S. PATENT DOCUMENTS

| | | |
|---|---|---|
| 3,950,735 A | 4/1976 | Patel |
| 4,644,532 A | 2/1987 | George et al. |

(Continued)

FOREIGN PATENT DOCUMENTS

| | | |
|---|---|---|
| CA | 2080530 A1 | 4/1994 |
| EP | 0605088 A3 | 7/1994 |

(Continued)

OTHER PUBLICATIONS

Authors: Ueli M. Maurer and Pierre E. Schmid "A Calculus for Secure Channel Establishment in Open Networks" pp. 18 (Year: 1994).*

(Continued)

*Primary Examiner* — Samson B Lemma
*Assistant Examiner* — Ali H. Cheema
(74) *Attorney, Agent, or Firm* — Troutman Pepper Hamilton Sanders LLP (Rochester)

(57) ABSTRACT

Methods, non-transitory computer readable media, and network traffic management apparatuses that obtain one or more custom selection rules and one or more custom priority rules via a graphical user interface (GUI). One or more of the custom selection rules are applied to a cipher suite database to generate a result set of cipher suites. The cipher suite database includes a plurality of cipher suite sets. One or more of the custom priority rules are applied to the result set of cipher suites to generate an ordered result set of cipher suites. A cipher string is generated based on the ordered result set of cipher suites. The cipher string is stored in a secure socket layer (SSL) profile to be used during negotiation of secure network sessions.

17 Claims, 5 Drawing Sheets

(51) Int. Cl.
*H04L 29/06* (2006.01)
*G06F 21/60* (2013.01)
*G06F 3/0482* (2013.01)

(52) U.S. Cl.
CPC ...... *H04L 63/0428* (2013.01); *H04L 63/1425* (2013.01); *H04L 63/1433* (2013.01)

(58) Field of Classification Search
CPC ..... H04L 63/08; H04L 9/0844; H04L 9/0637; H04L 63/168; H04L 63/0823; H04L 63/1466; H04L 63/0428; H04L 63/0435; H04L 63/0281; G06F 3/0482; G06F 21/602; G06F 21/52; G06F 8/71; G06F 21/72
USPC ....... 713/164, 168, 156, 150; 726/1; 380/37; 709/237
See application file for complete search history.

(56) References Cited

U.S. PATENT DOCUMENTS

| | | |
|---|---|---|
| 4,897,781 A | 1/1990 | Chang et al. |
| 4,965,772 A | 10/1990 | Daniel et al. |
| 5,023,826 A | 6/1991 | Patel |
| 5,053,953 A | 10/1991 | Patel |
| 5,167,024 A | 11/1992 | Smith et al. |
| 5,282,201 A | 1/1994 | Frank et al. |
| 5,299,312 A | 3/1994 | Rocco, Jr. |
| 5,327,529 A | 7/1994 | Fults et al. |
| 5,367,635 A | 11/1994 | Bauer et al. |
| 5,371,852 A | 12/1994 | Attanasio et al. |
| 5,406,502 A | 4/1995 | Haramaty et al. |
| 5,475,857 A | 12/1995 | Dally |
| 5,517,617 A | 5/1996 | Sathaye et al. |
| 5,519,694 A | 5/1996 | Brewer et al. |
| 5,519,778 A | 5/1996 | Leighton et al. |
| 5,521,591 A | 5/1996 | Arora et al. |
| 5,528,701 A | 6/1996 | Aref |
| 5,550,816 A | 8/1996 | Hardwick et al. |
| 5,581,764 A | 12/1996 | Fitzgerald et al. |
| 5,596,742 A | 1/1997 | Agarwal et al. |
| 5,606,665 A | 2/1997 | Yang et al. |
| 5,611,049 A | 3/1997 | Pitts |
| 5,623,490 A | 4/1997 | Richter et al. |
| 5,663,018 A | 9/1997 | Cummings et al. |
| 5,752,023 A | 5/1998 | Choucri et al. |
| 5,761,484 A | 6/1998 | Agarwal et al. |
| 5,768,423 A | 6/1998 | Aref et al. |
| 5,774,660 A | 6/1998 | Brendel et al. |
| 5,790,554 A | 8/1998 | Pitcher et al. |
| 5,802,052 A | 9/1998 | Venkataraman |
| 5,812,550 A | 9/1998 | Sohn et al. |
| 5,825,772 A | 10/1998 | Dobbins et al. |
| 5,832,283 A | 11/1998 | Chou et al. |
| 5,858,009 A | 1/1999 | Jonkman |
| 5,875,296 A | 2/1999 | Shi et al. |
| 5,892,914 A | 4/1999 | Pitts |
| 5,892,932 A | 4/1999 | Kim |
| 5,919,247 A | 7/1999 | Van Hoff et al. |
| 5,936,939 A | 8/1999 | Des Jardins et al. |
| 5,941,988 A | 8/1999 | Bhagwat et al. |
| 5,946,690 A | 8/1999 | Pitts |
| 5,949,885 A | 9/1999 | Leighton |
| 5,951,694 A | 9/1999 | Choquier et al. |
| 5,959,990 A | 9/1999 | Frantz et al. |
| 5,974,460 A | 10/1999 | Maddalozzo, Jr. et al. |
| 5,983,281 A | 11/1999 | Ogle et al. |
| 5,988,847 A | 11/1999 | McLaughlin et al. |
| 5,991,302 A | 11/1999 | Berl et al. |
| 5,995,491 A | 11/1999 | Richter et al. |
| 6,006,260 A | 12/1999 | Barrick, Jr. et al. |
| 6,006,264 A | 12/1999 | Colby et al. |
| 6,026,452 A | 2/2000 | Pitts |
| 6,026,500 A | 2/2000 | Topff et al. |
| 6,028,857 A | 2/2000 | Poor |
| 6,029,175 A | 2/2000 | Chow et al. |
| 6,041,365 A | 3/2000 | Kleinerman |
| 6,047,356 A | 4/2000 | Anderson et al. |
| 6,051,169 A | 4/2000 | Brown et al. |
| 6,067,558 A | 5/2000 | Wendt et al. |
| 6,078,956 A | 6/2000 | Bryant et al. |
| 6,085,234 A | 7/2000 | Pitts et al. |
| 6,092,196 A | 7/2000 | Reiche |
| 6,104,706 A | 8/2000 | Richter et al. |
| 6,108,703 A | 8/2000 | Leighton et al. |
| 6,111,876 A | 8/2000 | Frantz et al. |
| 6,128,279 A | 10/2000 | O'Neil et al. |
| 6,128,657 A | 10/2000 | Okanoya et al. |
| 6,154,777 A | 11/2000 | Ebrahim |
| 6,157,950 A | 12/2000 | Krishnan |
| 6,160,874 A | 12/2000 | Dickerman et al. |
| 6,170,022 B1 | 1/2001 | Linville et al. |
| 6,178,423 B1 | 1/2001 | Douceur et al. |
| 6,182,139 B1 | 1/2001 | Brendel |
| 6,192,051 B1 | 2/2001 | Lipman et al. |
| 6,233,612 B1 | 5/2001 | Fruchtman et al. |
| 6,246,684 B1 | 6/2001 | Chapman et al. |
| 6,253,226 B1 | 6/2001 | Chidambaran et al. |
| 6,253,230 B1 | 6/2001 | Couland et al. |
| 6,259,405 B1 | 7/2001 | Stewart et al. |
| 6,260,070 B1 | 7/2001 | Shah |
| 6,263,368 B1 | 7/2001 | Martin |
| 6,289,012 B1 | 9/2001 | Harrington et al. |
| 6,292,832 B1 | 9/2001 | Shah et al. |
| 6,298,380 B1 | 10/2001 | Coile et al. |
| 6,304,913 B1 | 10/2001 | Rune |
| 6,327,622 B1 | 12/2001 | Jindal et al. |
| 6,330,574 B1 | 12/2001 | Murashita |
| 6,338,082 B1 | 1/2002 | Schneider |
| 6,343,324 B1 | 1/2002 | Hubis et al. |
| 6,347,339 B1 | 2/2002 | Morris et al. |
| 6,353,848 B1 | 3/2002 | Morris |
| 6,360,270 B1 | 3/2002 | Cherkasova et al. |
| 6,363,056 B1 | 3/2002 | Beigi et al. |
| 6,370,527 B1 | 4/2002 | Singhal |
| 6,374,300 B2 | 4/2002 | Masters |
| 6,389,462 B1 | 5/2002 | Cohen et al. |
| 6,389,534 B1 * | 5/2002 | Elgamal ................ G06F 21/602 713/164 |
| 6,396,833 B1 | 5/2002 | Zhang et al. |
| 6,430,562 B1 | 8/2002 | Kardos et al. |
| 6,434,081 B1 | 8/2002 | Johnson et al. |
| 6,446,108 B1 | 9/2002 | Rosenberg et al. |
| 6,466,580 B1 | 10/2002 | Leung |
| 6,469,983 B2 | 10/2002 | Narayana et al. |
| 6,480,476 B1 | 11/2002 | Willars |
| 6,484,261 B1 | 11/2002 | Wiegel |
| 6,490,624 B1 | 12/2002 | Sampson et al. |
| 6,510,135 B1 | 1/2003 | Almulhem et al. |
| 6,510,458 B1 | 1/2003 | Berstis et al. |
| 6,513,061 B1 | 1/2003 | Ebata et al. |
| 6,514,085 B2 | 2/2003 | Slattery et al. |
| 6,519,643 B1 | 2/2003 | Foulkes et al. |
| 6,542,936 B1 | 4/2003 | Mayle et al. |
| 6,560,230 B1 | 5/2003 | Li et al. |
| 6,578,069 B1 | 6/2003 | Hopmann et al. |
| 6,601,084 B1 | 7/2003 | Bhaskaran et al. |
| 6,615,267 B1 | 9/2003 | Whalen et al. |
| 6,631,422 B1 | 10/2003 | Althaus et al. |
| 6,636,503 B1 | 10/2003 | Shiran et al. |
| 6,636,894 B1 | 10/2003 | Short et al. |
| 6,650,640 B1 | 11/2003 | Muller et al. |
| 6,650,641 B1 | 11/2003 | Albert et al. |
| 6,654,346 B1 | 11/2003 | Mahalingaiah et al. |
| 6,654,701 B2 | 11/2003 | Hatley |
| 6,683,873 B1 | 1/2004 | Kwok et al. |
| 6,691,165 B1 | 2/2004 | Bruck et al. |
| 6,694,517 B1 | 2/2004 | James et al. |
| 6,701,415 B1 | 3/2004 | Hendren, III |
| 6,708,187 B1 | 3/2004 | Shanumgam et al. |
| 6,708,220 B1 | 3/2004 | Olin |
| 6,711,264 B1 | 3/2004 | Matsumoto |
| 6,711,677 B1 | 3/2004 | Wiegley |

(56) References Cited

U.S. PATENT DOCUMENTS

| | | |
|---|---|---|
| 6,718,380 B1 | 4/2004 | Mohaban et al. |
| 6,728,704 B2 | 4/2004 | Mao et al. |
| 6,738,357 B1 | 5/2004 | Richter et al. |
| 6,742,045 B1 | 5/2004 | Albert et al. |
| 6,744,776 B1 | 6/2004 | Kalkunte et al. |
| 6,751,663 B1 | 6/2004 | Farrell et al. |
| 6,754,215 B1 | 6/2004 | Arikawa et al. |
| 6,754,228 B1 | 6/2004 | Ludwig |
| 6,754,699 B2 | 6/2004 | Swildens et al. |
| 6,760,337 B1 | 7/2004 | Snyder, II et al. |
| 6,760,775 B1 | 7/2004 | Anerousis et al. |
| 6,772,219 B1 | 8/2004 | Shobatake |
| 6,779,039 B1 | 8/2004 | Bommareddy et al. |
| 6,781,986 B1 | 8/2004 | Sabaa et al. |
| 6,795,860 B1 | 9/2004 | Shah |
| 6,798,777 B1 | 9/2004 | Ferguson et al. |
| 6,816,901 B1 | 11/2004 | Sitaraman et al. |
| 6,816,977 B2 | 11/2004 | Brakmo et al. |
| 6,804,542 B1 | 12/2004 | Haartsen |
| 6,829,238 B2 | 12/2004 | Tokuyo et al. |
| 6,862,282 B1 | 3/2005 | Oden |
| 6,865,593 B1 | 3/2005 | Reshef et al. |
| 6,868,082 B1 | 3/2005 | Allen, Jr. et al. |
| 6,868,447 B1 | 3/2005 | Slaughter et al. |
| 6,871,221 B1 | 3/2005 | Styles |
| 6,876,629 B2 | 4/2005 | Beshai et al. |
| 6,876,654 B1 | 4/2005 | Hegde |
| 6,880,017 B1 | 4/2005 | Marce et al. |
| 6,883,137 B1 | 4/2005 | Girardot et al. |
| 6,886,102 B1 | 4/2005 | Lyle |
| 6,888,836 B1 | 5/2005 | Cherkasova |
| 6,895,504 B1 | 5/2005 | Zhang |
| 6,904,040 B2 | 6/2005 | Salapura et al. |
| 6,914,881 B1 | 7/2005 | Mansfield et al. |
| 6,928,082 B2 | 8/2005 | Liu et al. |
| 6,929,518 B2 | 8/2005 | Talagala |
| 6,947,985 B2 | 9/2005 | Hegli et al. |
| 6,950,434 B1 | 9/2005 | Viswanath et al. |
| 6,954,780 B2 | 10/2005 | Susai et al. |
| 6,957,272 B2 | 10/2005 | Tallegas et al. |
| 6,959,394 B1 | 10/2005 | Brickell et al. |
| 6,970,475 B1 | 11/2005 | Fraser et al. |
| 6,970,924 B1 | 11/2005 | Chu et al. |
| 6,971,028 B1 | 11/2005 | Lyle |
| 6,973,490 B1 | 12/2005 | Robertson et al. |
| 6,975,592 B1 | 12/2005 | Seddigh et al. |
| 6,987,763 B2 | 1/2006 | Rochberger et al. |
| 6,990,074 B2 | 1/2006 | Wan et al. |
| 6,990,114 B1 | 1/2006 | Erimli et al. |
| 7,003,564 B2 | 2/2006 | Greuel et al. |
| 7,006,502 B2 | 2/2006 | Lin |
| 7,007,092 B2 | 2/2006 | Peiffer |
| 7,020,713 B1 | 3/2006 | Shah et al. |
| 7,023,974 B1 | 4/2006 | Brannam et al. |
| 7,035,212 B1 | 4/2006 | Mittal et al. |
| 7,039,061 B2 | 5/2006 | Connor et al. |
| 7,065,482 B2 | 6/2006 | Shorey et al. |
| 7,075,924 B2 | 7/2006 | Richter et al. |
| 7,076,689 B2 | 7/2006 | Atkinson |
| 7,080,314 B1 | 7/2006 | Garofalakis et al. |
| 7,089,491 B2 | 8/2006 | Feinberg et al. |
| 7,113,993 B1 | 9/2006 | Capiello et al. |
| 7,113,996 B2 | 9/2006 | Kronenberg |
| 7,121,460 B1 | 10/2006 | Parsons |
| 7,133,863 B2 | 11/2006 | Teng et al. |
| 7,133,944 B2 | 11/2006 | Song et al. |
| 7,139,792 B1 | 11/2006 | Mishra et al. |
| 7,161,904 B2 | 1/2007 | Hussain et al. |
| 7,191,163 B2 | 3/2007 | Herrara et al. |
| 7,200,234 B2 | 4/2007 | Bousis |
| 7,206,932 B1 | 4/2007 | Kirchhoff |
| 7,219,223 B1 * | 5/2007 | Bacchus ............ H04L 63/0428 713/150 |
| 7,228,359 B1 | 6/2007 | Monteiro |
| 7,228,422 B2 | 6/2007 | Morioka et al. |
| 7,229,009 B1 | 6/2007 | Parsons |
| 7,236,491 B2 | 6/2007 | Tsao et al. |
| 7,240,100 B1 | 7/2007 | Wein et al. |
| 7,257,633 B2 | 8/2007 | Masputra et al. |
| 7,287,082 B1 | 10/2007 | O'Toole, Jr. |
| 7,292,541 B1 | 11/2007 | Cs |
| 7,295,827 B1 | 11/2007 | Liu et al. |
| 7,296,263 B1 | 11/2007 | Jacob |
| 7,308,475 B1 | 12/2007 | Pruitt et al. |
| 7,308,703 B2 | 12/2007 | Wright et al. |
| 7,309,004 B1 | 12/2007 | Muschellack et al. |
| 7,321,926 B1 | 1/2008 | Zhang et al. |
| 7,324,533 B1 | 1/2008 | DeLiberato et al. |
| 7,331,038 B1 | 2/2008 | Snodgrass |
| 7,333,999 B1 | 2/2008 | Njemanze |
| 7,340,571 B2 | 3/2008 | Saze |
| 7,343,413 B2 | 3/2008 | Gilde et al. |
| 7,349,391 B2 | 3/2008 | Ben-Dor et al. |
| 7,373,438 B1 | 5/2008 | DeBergalis et al. |
| 7,398,552 B2 | 7/2008 | Pardee et al. |
| 7,409,440 B1 | 8/2008 | Jacob |
| 7,417,990 B2 | 8/2008 | Ikeda et al. |
| 7,433,962 B2 | 10/2008 | Janssen et al. |
| 7,454,480 B2 | 11/2008 | Labio et al. |
| 7,487,353 B2 | 2/2009 | Pryor et al. |
| 7,490,162 B1 | 2/2009 | Masters |
| 7,500,243 B2 | 3/2009 | Huetsch et al. |
| 7,500,269 B2 | 3/2009 | Huotari et al. |
| 7,505,795 B1 | 3/2009 | Lim et al. |
| 7,516,492 B1 | 4/2009 | Nisbet et al. |
| 7,526,541 B2 | 4/2009 | Roese et al. |
| 7,555,608 B2 | 6/2009 | Naik et al. |
| 7,558,197 B1 | 7/2009 | Sindhu et al. |
| 7,577,723 B2 | 8/2009 | Matsuda et al. |
| 7,580,971 B1 | 8/2009 | Gollapudi et al. |
| 7,624,424 B2 | 11/2009 | Morita et al. |
| 7,640,235 B2 | 12/2009 | Shulman et al. |
| 7,640,347 B1 | 12/2009 | Sloat et al. |
| 7,644,137 B2 | 1/2010 | Bozak et al. |
| 7,668,166 B1 | 2/2010 | Rekhter et al. |
| 7,684,423 B2 | 3/2010 | Tripathi et al. |
| 7,698,458 B1 | 4/2010 | Lui et al. |
| 7,721,951 B1 | 5/2010 | Parsons et al. |
| 7,724,657 B2 | 5/2010 | Rao et al. |
| 7,725,093 B2 | 5/2010 | Sengupta et al. |
| 7,733,859 B2 | 6/2010 | Takahashi |
| 7,743,420 B2 | 6/2010 | Shulman et al. |
| 7,752,662 B2 | 7/2010 | Shulman et al. |
| 7,778,187 B2 | 8/2010 | Chaturvedi et al. |
| 7,801,978 B1 | 9/2010 | Susai et al. |
| 7,822,839 B1 | 10/2010 | Pruitt et al. |
| 7,831,662 B2 | 11/2010 | Clark et al. |
| 7,861,085 B1 | 12/2010 | Case et al. |
| 7,877,511 B1 | 1/2011 | Berger et al. |
| 7,881,446 B1 | 2/2011 | Apple |
| 7,895,653 B2 | 2/2011 | Calo et al. |
| 7,903,554 B1 | 3/2011 | Manur et al. |
| 7,908,245 B2 | 3/2011 | Nakano et al. |
| 7,908,314 B2 | 3/2011 | Yamaguchi et al. |
| 7,925,908 B2 | 4/2011 | Kim |
| 7,933,946 B2 | 4/2011 | Livshits et al. |
| 7,945,908 B1 | 5/2011 | Waldspurger et al. |
| 7,958,222 B1 | 6/2011 | Pruitt et al. |
| 7,984,141 B2 | 7/2011 | Gupta et al. |
| 7,984,500 B1 | 7/2011 | Khanna et al. |
| 7,988,039 B1 | 8/2011 | Muschellack |
| 8,015,595 B2 | 9/2011 | Benbrahim |
| 8,024,443 B1 | 9/2011 | Jacob |
| 8,031,849 B1 | 10/2011 | Apple |
| 8,037,528 B2 | 10/2011 | Williams et al. |
| 8,046,504 B2 | 10/2011 | Feinberg |
| 8,064,342 B2 | 11/2011 | Badger |
| 8,064,580 B1 | 11/2011 | Apple |
| 8,069,225 B2 | 11/2011 | McCann et al. |
| 8,081,958 B2 | 12/2011 | Soderstrom |
| 8,117,244 B2 | 2/2012 | Marinov et al. |
| 8,130,650 B2 | 3/2012 | Allen, Jr. et al. |
| 8,154,999 B2 | 4/2012 | Tsuge |
| 8,155,128 B2 | 4/2012 | Balyan et al. |

(56) References Cited

U.S. PATENT DOCUMENTS

| | | |
|---|---|---|
| 8,171,124 B2 | 5/2012 | Kondamuru |
| 8,180,747 B2 | 5/2012 | Marinkovic et al. |
| 8,190,769 B1 | 5/2012 | Shukla et al. |
| 8,199,757 B2 | 6/2012 | Pani et al. |
| 8,261,087 B2 | 9/2012 | Fort |
| 8,271,620 B2 | 9/2012 | Witchey |
| 8,276,140 B1 | 9/2012 | Beda et al. |
| 8,295,446 B1 | 10/2012 | Apple |
| 8,351,333 B2 | 1/2013 | Rao et al. |
| 8,380,854 B2 | 2/2013 | Szabo |
| 8,396,836 B1 | 3/2013 | Ferguson et al. |
| 8,447,871 B1 | 5/2013 | Szabo |
| 8,463,850 B1 | 6/2013 | McCann |
| 8,464,265 B2 | 6/2013 | Worley |
| 8,484,348 B2 | 7/2013 | Subramanian et al. |
| 8,560,693 B1 | 10/2013 | Wang et al. |
| 8,601,000 B1 | 12/2013 | Stefani et al. |
| 8,606,234 B2 | 12/2013 | Pei |
| 8,606,921 B2 | 12/2013 | Vasquez et al. |
| 8,615,022 B2 | 12/2013 | Harrison et al. |
| 8,665,868 B2 | 3/2014 | Kay |
| 8,701,179 B1 | 4/2014 | Penno et al. |
| 8,788,665 B2 | 7/2014 | Glide et al. |
| 8,804,504 B1 | 8/2014 | Chen |
| 8,830,874 B2 | 9/2014 | Cho et al. |
| 8,838,817 B1 | 9/2014 | Biswas |
| 8,879,431 B2 | 11/2014 | Ridel et al. |
| 8,959,215 B2 | 2/2015 | Koponen et al. |
| 9,143,451 B2 | 9/2015 | Amdahl et al. |
| 9,390,291 B2* | 7/2016 | Cox ............... G06F 21/72 |
| 9,479,480 B2* | 10/2016 | Ovsiannikov ....... H04L 63/0272 |
| 9,893,883 B1* | 2/2018 | Chaubey ............ H04L 63/168 |
| 9,923,923 B1* | 3/2018 | Sharifi Mehr ............ H04L 9/14 |
| 9,935,769 B1* | 4/2018 | Mehr ................. H04L 9/14 |
| 10,171,495 B1* | 1/2019 | Bowen ............ H04L 63/1466 |
| 10,374,800 B1* | 8/2019 | Sharifi Mehr ............ H04L 9/14 |
| 10,567,434 B1* | 2/2020 | Sharifi Mehr ...... H04L 63/0435 |
| 2001/0007560 A1 | 7/2001 | Masuda et al. |
| 2001/0023442 A1 | 9/2001 | Masters |
| 2002/0004784 A1 | 1/2002 | Forbes |
| 2002/0010757 A1 | 1/2002 | Granik et al. |
| 2002/0012352 A1 | 1/2002 | Hansson et al. |
| 2002/0032855 A1 | 3/2002 | Neves |
| 2002/0038360 A1 | 3/2002 | Andrews et al. |
| 2002/0040400 A1 | 4/2002 | Masters |
| 2002/0049842 A1 | 4/2002 | Huetsch et al. |
| 2002/0059428 A1 | 5/2002 | Susai et al. |
| 2002/0065848 A1 | 5/2002 | Walker et al. |
| 2002/0065922 A1 | 5/2002 | Shastri |
| 2002/0072048 A1 | 6/2002 | Slattery et al. |
| 2002/0083067 A1 | 6/2002 | Tamayo et al. |
| 2002/0085710 A1 | 7/2002 | Ananth |
| 2002/0087571 A1 | 7/2002 | Stapel et al. |
| 2002/0087744 A1 | 7/2002 | Kitchin |
| 2002/0099829 A1 | 7/2002 | Richards et al. |
| 2002/0099842 A1 | 7/2002 | Jennings et al. |
| 2002/0103823 A1 | 8/2002 | Jackson et al. |
| 2002/0128908 A1 | 9/2002 | Levin |
| 2002/0138615 A1 | 9/2002 | Schmeling |
| 2002/0143819 A1 | 10/2002 | Han et al. |
| 2002/0143852 A1 | 10/2002 | Guo et al. |
| 2002/0161913 A1 | 10/2002 | Gonzalez et al. |
| 2002/0162118 A1 | 10/2002 | Levy et al. |
| 2002/0174216 A1 | 11/2002 | Shorey et al. |
| 2002/0194112 A1 | 12/2002 | dePinto et al. |
| 2002/0194342 A1 | 12/2002 | Lu et al. |
| 2002/0198956 A1 | 12/2002 | Dunshea et al. |
| 2002/0198993 A1 | 12/2002 | Cudd et al. |
| 2003/0005172 A1 | 1/2003 | Chessell |
| 2003/0009528 A1 | 1/2003 | Sharif et al. |
| 2003/0018450 A1 | 1/2003 | Carley |
| 2003/0018585 A1 | 1/2003 | Butler et al. |
| 2003/0034905 A1 | 2/2003 | Anton et al. |
| 2003/0046291 A1 | 3/2003 | Fascenda |
| 2003/0051045 A1 | 3/2003 | Connor |
| 2003/0053632 A1 | 3/2003 | Bousis |
| 2003/0055723 A1 | 3/2003 | English |
| 2003/0065951 A1 | 4/2003 | Igeta et al. |
| 2003/0069918 A1 | 4/2003 | Lu et al. |
| 2003/0069974 A1 | 4/2003 | Lu et al. |
| 2003/0070069 A1 | 4/2003 | Belapurkar et al. |
| 2003/0074301 A1 | 4/2003 | Solomon |
| 2003/0086415 A1 | 5/2003 | Bernhard et al. |
| 2003/0105846 A1 | 6/2003 | Zhao et al. |
| 2003/0105983 A1 | 6/2003 | Brakmo et al. |
| 2003/0108000 A1 | 6/2003 | Chaney et al. |
| 2003/0108002 A1 | 6/2003 | Chaney et al. |
| 2003/0108052 A1 | 6/2003 | Inoue et al. |
| 2003/0128708 A1 | 7/2003 | Inoue et al. |
| 2003/0130945 A1 | 7/2003 | Force et al. |
| 2003/0131115 A1 | 7/2003 | Mi |
| 2003/0139934 A1 | 7/2003 | Mandera |
| 2003/0145062 A1 | 7/2003 | Sharma et al. |
| 2003/0145233 A1 | 7/2003 | Poletto et al. |
| 2003/0156586 A1 | 8/2003 | Lee et al. |
| 2003/0163576 A1 | 8/2003 | Janssen et al. |
| 2003/0179755 A1 | 9/2003 | Fraser |
| 2003/0187805 A1 | 10/2003 | Shen |
| 2003/0189936 A1 | 10/2003 | Terrell et al. |
| 2003/0191812 A1 | 10/2003 | Agarwalla et al. |
| 2003/0195813 A1 | 10/2003 | Pallister et al. |
| 2003/0195962 A1 | 10/2003 | Kikuchi et al. |
| 2003/0212954 A1 | 11/2003 | Patrudu |
| 2003/0220835 A1 | 11/2003 | Barnes, Jr. |
| 2003/0225485 A1 | 12/2003 | Fritz et al. |
| 2003/0229665 A1 | 12/2003 | Ryman |
| 2003/0236995 A1 | 12/2003 | Fretwell, Jr. |
| 2004/0003287 A1 | 1/2004 | Zissimopoulos et al. |
| 2004/0006591 A1 | 1/2004 | Matsui et al. |
| 2004/0015783 A1 | 1/2004 | Lennon et al. |
| 2004/0017825 A1 | 1/2004 | Stanwood et al. |
| 2004/0017913 A1* | 1/2004 | Hawkes ............. H04L 9/0637 380/37 |
| 2004/0030627 A1 | 2/2004 | Sedukhin |
| 2004/0030740 A1 | 2/2004 | Stelting |
| 2004/0039924 A1 | 2/2004 | Baldwin |
| 2004/0043758 A1 | 3/2004 | Sorvari et al. |
| 2004/0059789 A1 | 3/2004 | Shum |
| 2004/0064544 A1 | 4/2004 | Barsness et al. |
| 2004/0064554 A1 | 4/2004 | Kuno et al. |
| 2004/0072569 A1 | 4/2004 | Omae et al. |
| 2004/0073792 A1 | 4/2004 | Noble |
| 2004/0093361 A1 | 5/2004 | Therrien et al. |
| 2004/0096055 A1 | 5/2004 | Williams |
| 2004/0103283 A1 | 5/2004 | Hornak |
| 2004/0111523 A1 | 6/2004 | Hall et al. |
| 2004/0111621 A1 | 6/2004 | Himberger et al. |
| 2004/0117493 A1 | 6/2004 | Bazot et al. |
| 2004/0122926 A1 | 6/2004 | Moore et al. |
| 2004/0123277 A1 | 6/2004 | Schrader et al. |
| 2004/0133605 A1 | 7/2004 | Chang et al. |
| 2004/0138858 A1 | 7/2004 | Carley |
| 2004/0151186 A1 | 8/2004 | Akama |
| 2004/0167967 A1 | 8/2004 | Bastian et al. |
| 2004/0177165 A1 | 9/2004 | Masputra et al. |
| 2004/0187036 A1 | 9/2004 | Nakamura |
| 2004/0192312 A1 | 9/2004 | Li et al. |
| 2004/0213156 A1 | 10/2004 | Smallwood et al. |
| 2004/0215665 A1 | 10/2004 | Edgar et al. |
| 2004/0236826 A1 | 11/2004 | Harville et al. |
| 2004/0264472 A1 | 12/2004 | Oliver et al. |
| 2004/0264481 A1 | 12/2004 | Darling et al. |
| 2004/0267920 A1 | 12/2004 | Hydrie et al. |
| 2004/0267948 A1 | 12/2004 | Oliver et al. |
| 2004/0268358 A1 | 12/2004 | Darling et al. |
| 2005/0004887 A1 | 1/2005 | Igakura et al. |
| 2005/0008017 A1 | 1/2005 | Datta et al. |
| 2005/0021703 A1 | 1/2005 | Cherry et al. |
| 2005/0021736 A1 | 1/2005 | Carusi et al. |
| 2005/0027841 A1 | 2/2005 | Rolfe |
| 2005/0027869 A1 | 2/2005 | Johnson |
| 2005/0044158 A1 | 2/2005 | Malik |
| 2005/0044213 A1 | 2/2005 | Kobayashi et al. |
| 2005/0052440 A1 | 3/2005 | Kim et al. |

(56) References Cited

U.S. PATENT DOCUMENTS

| | | |
|---|---|---|
| 2005/0055435 A1 | 3/2005 | Gbadegesin et al. |
| 2005/0060590 A1 | 3/2005 | Bradley et al. |
| 2005/0078604 A1 | 4/2005 | Yim |
| 2005/0117589 A1 | 6/2005 | Douady et al. |
| 2005/0122977 A1 | 6/2005 | Lieberman |
| 2005/0137983 A1 | 6/2005 | Bells |
| 2005/0149459 A1* | 7/2005 | Kofman ............... G06N 7/026 706/2 |
| 2005/0154837 A1 | 7/2005 | Keohane et al. |
| 2005/0165656 A1 | 7/2005 | Frederick et al. |
| 2005/0174944 A1 | 8/2005 | Legault et al. |
| 2005/0175013 A1 | 8/2005 | Le Pennec et al. |
| 2005/0187866 A1 | 8/2005 | Lee |
| 2005/0188220 A1 | 8/2005 | Nilsson et al. |
| 2005/0198234 A1 | 9/2005 | Leib et al. |
| 2005/0198310 A1 | 9/2005 | Kim et al. |
| 2005/0198501 A1 | 9/2005 | Andreev |
| 2005/0213587 A1 | 9/2005 | Cho et al. |
| 2005/0234928 A1 | 10/2005 | Shkvarchuk et al. |
| 2005/0240664 A1 | 10/2005 | Chen et al. |
| 2005/0251802 A1 | 11/2005 | Bozek et al. |
| 2005/0256806 A1 | 11/2005 | Tien et al. |
| 2005/0262238 A1 | 11/2005 | Reeves et al. |
| 2006/0013229 A1 | 1/2006 | Johansson |
| 2006/0031374 A1 | 2/2006 | Lu et al. |
| 2006/0031520 A1 | 2/2006 | Bedekar et al. |
| 2006/0031778 A1 | 2/2006 | Goodwin et al. |
| 2006/0045089 A1 | 3/2006 | Bacher et al. |
| 2006/0045096 A1 | 3/2006 | Farmer et al. |
| 2006/0047785 A1 | 3/2006 | Wang et al. |
| 2006/0059267 A1 | 3/2006 | Cugi et al. |
| 2006/0072572 A1 | 4/2006 | Ikeda |
| 2006/0077902 A1 | 4/2006 | Kannan et al. |
| 2006/0100752 A1 | 5/2006 | Kim et al. |
| 2006/0112176 A1 | 5/2006 | Liu et al. |
| 2006/0112272 A1 | 5/2006 | Morioka et al. |
| 2006/0112367 A1 | 5/2006 | Harris |
| 2006/0123210 A1 | 6/2006 | Pritchett et al. |
| 2006/0129684 A1 | 6/2006 | Datta |
| 2006/0130133 A1 | 6/2006 | Andreev et al. |
| 2006/0133374 A1 | 6/2006 | Sekiguchi |
| 2006/0135198 A1 | 6/2006 | Lee |
| 2006/0140193 A1 | 6/2006 | Kakani et al. |
| 2006/0153201 A1 | 7/2006 | Hepper et al. |
| 2006/0156416 A1 | 7/2006 | Huotari et al. |
| 2006/0161577 A1 | 7/2006 | Kulkami et al. |
| 2006/0171365 A1 | 8/2006 | Borella |
| 2006/0209669 A1 | 9/2006 | Nishio |
| 2006/0209853 A1 | 9/2006 | Hidaka et al. |
| 2006/0229861 A1 | 10/2006 | Tatsuoka et al. |
| 2006/0230148 A1 | 10/2006 | Forecast et al. |
| 2006/0233106 A1 | 10/2006 | Achlioptas et al. |
| 2006/0235998 A1 | 10/2006 | Stecher et al. |
| 2006/0242300 A1 | 10/2006 | Yumoto et al. |
| 2006/0259320 A1 | 11/2006 | LaSalle et al. |
| 2006/0264201 A1 | 11/2006 | Zhang |
| 2006/0265484 A1 | 11/2006 | Delia |
| 2006/0268692 A1 | 11/2006 | Wright et al. |
| 2006/0270341 A1 | 11/2006 | Kim et al. |
| 2006/0272008 A1 | 11/2006 | Shulman et al. |
| 2006/0282442 A1 | 12/2006 | Lennon et al. |
| 2006/0282529 A1 | 12/2006 | Nordin |
| 2006/0282545 A1* | 12/2006 | Arwe ................. G06F 8/71 709/237 |
| 2006/0288213 A1 | 12/2006 | Gasparini |
| 2007/0005807 A1 | 1/2007 | Wong |
| 2007/0006293 A1 | 1/2007 | Balakrishnan et al. |
| 2007/0016613 A1 | 1/2007 | Foresti et al. |
| 2007/0016662 A1 | 1/2007 | Desai et al. |
| 2007/0019636 A1 | 1/2007 | Lau et al. |
| 2007/0038994 A1 | 2/2007 | Davis et al. |
| 2007/0058670 A1 | 3/2007 | Konduru et al. |
| 2007/0064661 A1 | 3/2007 | Sood et al. |
| 2007/0067771 A1 | 3/2007 | Kulbak et al. |
| 2007/0083646 A1 | 4/2007 | Miller et al. |
| 2007/0088822 A1 | 4/2007 | Coile et al. |
| 2007/0106796 A1 | 5/2007 | Kudo et al. |
| 2007/0107048 A1 | 5/2007 | Halls et al. |
| 2007/0112775 A1 | 5/2007 | Ackerman |
| 2007/0113269 A1 | 5/2007 | Zhang |
| 2007/0118879 A1 | 5/2007 | Yeun |
| 2007/0124415 A1 | 5/2007 | Lev-Ran et al. |
| 2007/0124477 A1 | 5/2007 | Martin |
| 2007/0124502 A1 | 5/2007 | Li |
| 2007/0124806 A1 | 5/2007 | Shulman et al. |
| 2007/0130255 A1 | 6/2007 | Wolovitz et al. |
| 2007/0147246 A1 | 6/2007 | Hurley et al. |
| 2007/0150603 A1 | 6/2007 | Crull |
| 2007/0162891 A1 | 7/2007 | Burner et al. |
| 2007/0168320 A1 | 7/2007 | Borthakur et al. |
| 2007/0168525 A1 | 7/2007 | DeLeon et al. |
| 2007/0174491 A1 | 7/2007 | Still et al. |
| 2007/0192543 A1 | 8/2007 | Naik et al. |
| 2007/0214503 A1 | 9/2007 | Shulman et al. |
| 2007/0220598 A1 | 9/2007 | Salowey et al. |
| 2007/0233809 A1 | 10/2007 | Brownell et al. |
| 2007/0233826 A1 | 10/2007 | Tindal et al. |
| 2007/0250560 A1 | 10/2007 | Wein et al. |
| 2007/0274290 A1 | 11/2007 | Takahashi et al. |
| 2007/0294539 A1 | 12/2007 | Shulman et al. |
| 2007/0297410 A1 | 12/2007 | Yoon et al. |
| 2007/0297551 A1 | 12/2007 | Choi |
| 2008/0004022 A1 | 1/2008 | Johannesson et al. |
| 2008/0010372 A1 | 1/2008 | Khedouri et al. |
| 2008/0022059 A1 | 1/2008 | Zimmerer et al. |
| 2008/0025297 A1 | 1/2008 | Kashyap |
| 2008/0034136 A1 | 2/2008 | Ulenas |
| 2008/0034442 A1 | 2/2008 | Nonaka et al. |
| 2008/0034443 A1 | 2/2008 | Nonaka et al. |
| 2008/0049627 A1 | 2/2008 | Nordin |
| 2008/0072303 A1 | 3/2008 | Syed |
| 2008/0120370 A1 | 5/2008 | Chan et al. |
| 2008/0120592 A1 | 5/2008 | Tanguay et al. |
| 2008/0132215 A1 | 6/2008 | Soderstrom et al. |
| 2008/0133518 A1 | 6/2008 | Kapoor et al. |
| 2008/0134311 A1 | 6/2008 | Medvinsky et al. |
| 2008/0141246 A1 | 6/2008 | Kuck et al. |
| 2008/0148340 A1 | 6/2008 | Powell et al. |
| 2008/0159145 A1 | 7/2008 | Muthukrishnan et al. |
| 2008/0175393 A1 | 7/2008 | Oba et al. |
| 2008/0178277 A1 | 7/2008 | Oba et al. |
| 2008/0178278 A1 | 7/2008 | Grinstein et al. |
| 2008/0201599 A1 | 8/2008 | Ferraiolo et al. |
| 2008/0205613 A1 | 8/2008 | Lopez |
| 2008/0208917 A1 | 8/2008 | Smoot et al. |
| 2008/0209205 A1 | 8/2008 | Rowley |
| 2008/0212783 A1 | 9/2008 | Oba |
| 2008/0222646 A1 | 9/2008 | Sigal et al. |
| 2008/0225710 A1 | 9/2008 | Raja et al. |
| 2008/0229415 A1 | 9/2008 | Kapoor et al. |
| 2008/0253395 A1 | 10/2008 | Pandya |
| 2008/0256224 A1 | 10/2008 | Kaji et al. |
| 2008/0263401 A1 | 10/2008 | Stenzel |
| 2008/0270564 A1 | 10/2008 | Rangegowda et al. |
| 2008/0270578 A1 | 10/2008 | Zhang et al. |
| 2008/0281908 A1 | 11/2008 | McCann et al. |
| 2008/0281944 A1 | 11/2008 | Vorne et al. |
| 2008/0288661 A1 | 11/2008 | Gailes |
| 2008/0301760 A1 | 12/2008 | Lim |
| 2008/0320307 A1 | 12/2008 | Zhang et al. |
| 2009/0024853 A1 | 1/2009 | Yeap et al. |
| 2009/0028337 A1 | 1/2009 | Balabine et al. |
| 2009/0037995 A1 | 2/2009 | Zapata |
| 2009/0049230 A1 | 2/2009 | Pandya |
| 2009/0049438 A1 | 2/2009 | Draper et al. |
| 2009/0052671 A1 | 2/2009 | Bauchot et al. |
| 2009/0070617 A1 | 3/2009 | Arimilli et al. |
| 2009/0077618 A1* | 3/2009 | Pearce ............... H04L 63/0892 726/1 |
| 2009/0077619 A1 | 3/2009 | Boyce |
| 2009/0080440 A1 | 3/2009 | Balyan et al. |
| 2009/0089487 A1 | 4/2009 | Kwon et al. |
| 2009/0094311 A1 | 4/2009 | Awadallah et al. |
| 2009/0094610 A1 | 4/2009 | Sukirya |

(56) References Cited

U.S. PATENT DOCUMENTS

| | | |
|---|---|---|
| 2009/0097480 A1 | 4/2009 | Curtis et al. |
| 2009/0106409 A1 | 4/2009 | Murata |
| 2009/0106413 A1 | 4/2009 | Salo et al. |
| 2009/0119504 A1 | 5/2009 | Van Os et al. |
| 2009/0125496 A1 | 5/2009 | Wexler et al. |
| 2009/0125532 A1 | 5/2009 | Wexler et al. |
| 2009/0125625 A1 | 5/2009 | Shim et al. |
| 2009/0125955 A1 | 5/2009 | DeLorme |
| 2009/0131053 A1 | 5/2009 | Sachs et al. |
| 2009/0138314 A1 | 5/2009 | Bruce |
| 2009/0138749 A1 | 5/2009 | Moll et al. |
| 2009/0141891 A1 | 6/2009 | Boyen et al. |
| 2009/0157678 A1 | 6/2009 | Turk |
| 2009/0157882 A1 | 6/2009 | Kashyap |
| 2009/0161542 A1 | 6/2009 | Ho |
| 2009/0177698 A1 | 7/2009 | Chan et al. |
| 2009/0187915 A1 | 7/2009 | Chew et al. |
| 2009/0196282 A1 | 8/2009 | Fellman et al. |
| 2009/0198820 A1 | 8/2009 | Golla et al. |
| 2009/0217163 A1 | 8/2009 | Jaroker |
| 2009/0217386 A1 | 8/2009 | Schneider |
| 2009/0228956 A1 | 9/2009 | He et al. |
| 2009/0241176 A1 | 9/2009 | Beletski et al. |
| 2009/0248858 A1 | 10/2009 | Sivasubramanian |
| 2009/0265396 A1 | 10/2009 | Ram et al. |
| 2009/0265467 A1 | 10/2009 | Peles |
| 2009/0285118 A1 | 11/2009 | Yoshikawa et al. |
| 2009/0287935 A1 | 11/2009 | Aull et al. |
| 2009/0288143 A1 | 11/2009 | Stebila et al. |
| 2009/0289828 A1 | 11/2009 | Hinchey |
| 2009/0292957 A1 | 11/2009 | Bower et al. |
| 2009/0296624 A1 | 12/2009 | Ryu et al. |
| 2009/0300161 A1 | 12/2009 | Pruitt et al. |
| 2009/0300407 A1 | 12/2009 | Kamath et al. |
| 2009/0316708 A1 | 12/2009 | Yahyaoui et al. |
| 2009/0319600 A1 | 12/2009 | Sedan et al. |
| 2010/0009554 A1 | 1/2010 | Ryu et al. |
| 2010/0011434 A1 | 1/2010 | Kay |
| 2010/0017846 A1 | 1/2010 | Huang et al. |
| 2010/0017874 A1 | 1/2010 | Piccinini et al. |
| 2010/0023582 A1 | 1/2010 | Pedersen et al. |
| 2010/0042743 A1 | 2/2010 | Jeon et al. |
| 2010/0042869 A1 | 2/2010 | Szabo et al. |
| 2010/0058054 A1 | 3/2010 | Irvine |
| 2010/0061232 A1 | 3/2010 | Zhou et al. |
| 2010/0064001 A1 | 3/2010 | Daily |
| 2010/0070476 A1 | 3/2010 | O'Keefe et al. |
| 2010/0071048 A1 | 3/2010 | Novak et al. |
| 2010/0088752 A1 | 4/2010 | Nagulakonda et al. |
| 2010/0093318 A1 | 4/2010 | Zhu et al. |
| 2010/0103837 A1 | 4/2010 | Jungck et al. |
| 2010/0115236 A1 | 5/2010 | Bataineh et al. |
| 2010/0122091 A1 | 5/2010 | Huang et al. |
| 2010/0131654 A1 | 5/2010 | Malakapalli et al. |
| 2010/0134818 A1 | 6/2010 | Minamizono et al. |
| 2010/0146085 A1 | 6/2010 | Van Wie et al. |
| 2010/0150154 A1 | 6/2010 | Viger et al. |
| 2010/0154066 A1 | 6/2010 | Hammes et al. |
| 2010/0165877 A1 | 7/2010 | Shukla et al. |
| 2010/0179984 A1 | 7/2010 | Sebastian |
| 2010/0183150 A1 | 7/2010 | Lee |
| 2010/0199104 A1 | 8/2010 | Van Rijnswou |
| 2010/0228814 A1 | 9/2010 | McKenna et al. |
| 2010/0228819 A1 | 9/2010 | Wei |
| 2010/0242092 A1 | 9/2010 | Harris et al. |
| 2010/0250497 A1 | 9/2010 | Redlich et al. |
| 2010/0251330 A1 | 9/2010 | Kroeselberg et al. |
| 2010/0274772 A1 | 10/2010 | Samuels |
| 2010/0278733 A1 | 11/2010 | Karsten et al. |
| 2010/0287548 A1 | 11/2010 | Zhou et al. |
| 2010/0306169 A1 | 12/2010 | Pishevar et al. |
| 2010/0322250 A1 | 12/2010 | Shelly et al. |
| 2010/0323715 A1 | 12/2010 | Winters |
| 2010/0325277 A1 | 12/2010 | Muthiah et al. |
| 2011/0029581 A1 | 2/2011 | Zhao |
| 2011/0040889 A1 | 2/2011 | Garrett et al. |
| 2011/0047620 A1 | 2/2011 | Mahaffey et al. |
| 2011/0055921 A1 | 3/2011 | Narayanaswamy et al. |
| 2011/0066718 A1 | 3/2011 | Susai et al. |
| 2011/0066736 A1 | 3/2011 | Mitchell et al. |
| 2011/0072321 A1 | 3/2011 | Dhuse |
| 2011/0075667 A1 | 3/2011 | Li et al. |
| 2011/0078303 A1 | 3/2011 | Li et al. |
| 2011/0098087 A1 | 4/2011 | Tseng |
| 2011/0113095 A1 | 5/2011 | Hatami-Hanza |
| 2011/0153822 A1 | 6/2011 | Rajan et al. |
| 2011/0154443 A1 | 6/2011 | Thakur et al. |
| 2011/0167263 A1* | 7/2011 | Cross ................ H04L 63/0823 713/168 |
| 2011/0173295 A1 | 7/2011 | Bakke et al. |
| 2011/0184733 A1 | 7/2011 | Yu et al. |
| 2011/0185082 A1 | 7/2011 | Thompson |
| 2011/0188415 A1 | 8/2011 | Graziano |
| 2011/0213911 A1 | 9/2011 | Eldus et al. |
| 2011/0246651 A1 | 10/2011 | Djabarov |
| 2011/0246800 A1 | 10/2011 | Accpadi et al. |
| 2011/0273984 A1 | 11/2011 | Hsu et al. |
| 2011/0282997 A1 | 11/2011 | Prince et al. |
| 2011/0295996 A1 | 12/2011 | Qiu |
| 2011/0321122 A1 | 12/2011 | Mwangi et al. |
| 2012/0016994 A1 | 1/2012 | Nakamura et al. |
| 2012/0039341 A1 | 2/2012 | Latif et al. |
| 2012/0041965 A1 | 2/2012 | Vasquez et al. |
| 2012/0063314 A1 | 3/2012 | Pignataro et al. |
| 2012/0066489 A1 | 3/2012 | Ozaki et al. |
| 2012/0096461 A1 | 4/2012 | Goswami et al. |
| 2012/0101952 A1 | 4/2012 | Raleigh et al. |
| 2012/0117028 A1 | 5/2012 | Gold et al. |
| 2012/0131627 A1 | 5/2012 | Chittelia |
| 2012/0140620 A1 | 6/2012 | Hogan |
| 2012/0150805 A1 | 6/2012 | Pafumi et al. |
| 2012/0195273 A1 | 8/2012 | Iwamura et al. |
| 2012/0254293 A1 | 10/2012 | Winter et al. |
| 2012/0255022 A1 | 10/2012 | Ocepek et al. |
| 2012/0257506 A1 | 10/2012 | Bazlamacci et al. |
| 2012/0258766 A1 | 10/2012 | Cho et al. |
| 2012/0311153 A1 | 12/2012 | Morgan |
| 2012/0317266 A1 | 12/2012 | Abbott |
| 2013/0058229 A1 | 3/2013 | Casado et al. |
| 2013/0100819 A1 | 4/2013 | Anchan |
| 2013/0182713 A1 | 7/2013 | Giacomoni et al. |
| 2013/0198511 A1 | 8/2013 | Yoo et al. |
| 2013/0238472 A1 | 9/2013 | Fan et al. |
| 2013/0269007 A1 | 10/2013 | Yoshigaki |
| 2013/0336122 A1 | 12/2013 | Baruah et al. |
| 2013/0336126 A1 | 12/2013 | Vasseur |
| 2014/0025823 A1 | 1/2014 | Szabo et al. |
| 2014/0040478 A1 | 2/2014 | Hsu et al. |
| 2014/0071895 A1 | 3/2014 | Bane et al. |
| 2014/0089384 A1 | 3/2014 | Diaz |
| 2014/0089657 A1* | 3/2014 | Eguchi ................ H04L 63/0428 713/150 |
| 2014/0095661 A1 | 4/2014 | Knowles et al. |
| 2014/0099945 A1 | 4/2014 | Singh et al. |
| 2014/0105069 A1 | 4/2014 | Potnuru |
| 2014/0113600 A1 | 4/2014 | El Gamal |
| 2014/0187199 A1 | 7/2014 | Yan et al. |
| 2014/0286316 A1 | 9/2014 | Park et al. |
| 2015/0058595 A1 | 2/2015 | Gura et al. |
| 2016/0021110 A1* | 1/2016 | Sugano ................ H04L 63/166 713/156 |
| 2016/0070601 A1 | 3/2016 | Yamamoto |
| 2016/0241389 A1* | 8/2016 | Le Saint ................ H04L 9/14 |
| 2016/0373414 A1* | 12/2016 | MacCarthaigh .... H04L 63/0281 |
| 2018/0115521 A1* | 4/2018 | Bansal ................ H04L 63/08 |

FOREIGN PATENT DOCUMENTS

| | | |
|---|---|---|
| EP | 0744850 A2 | 11/1996 |
| EP | 1081918 A2 | 3/2001 |
| JP | 06-205006 | 7/1994 |
| JP | 8021924 B | 3/1996 |
| JP | 2000183935 | 6/2000 |
| WO | WO 91/14326 | 9/1991 |

(56) References Cited

FOREIGN PATENT DOCUMENTS

| WO | WO 95/05712 | 2/1995 |
|---|---|---|
| WO | WO 97/09805 | 3/1997 |
| WO | WO 97/45800 | 12/1997 |
| WO | WO 99/05829 | 2/1999 |
| WO | WO 99/06913 | 2/1999 |
| WO | WO 99/10858 | 3/1999 |
| WO | WO 99/39373 | 8/1999 |
| WO | WO 99/64967 | 12/1999 |
| WO | WO 00/04422 | 1/2000 |
| WO | WO 00/04458 | 1/2000 |
| WO | WO 00/58870 A2 | 10/2000 |
| WO | WO 02/39696 A2 | 5/2002 |
| WO | WO 2006/091040 A1 | 8/2006 |

OTHER PUBLICATIONS

Getting an A+ on the Qualys SSL Test—Windows Edition by "Scott Helme" Jan. 11, 2015 pp. 23 (Year: 2015).*

Redirection and cipher suite override based on SSL/TLS configuration now available Sep. 8, 2015 by Tushar Richabadas pp. 8 (Year: 2015).*

Penetration testing tips for your Netscaler—From the Architect http://neil.spellings.net/ pp. 08, Jan. 12, 2014.*

Getting an A+ on the Qualys SSL Test—Windows Edition by Scott Helme pp. 23 Jan. 11, 2015.*

Guidelines for the Selection and Use of Transport Layer Security (TLS) Implementations by C. Michael Chernick, Charles Edington III, Matthew J. Fanto, Rob Rosenthal pp. 33; Jun. 2005.*

F5 Networks Inc., "BIG-IP ASM 12.0.0", Release Notes, Jul. 17, 2017, pp. 1-14, vol. 12.0, F5 Networks, Inc., Retrieved from the Internet<https://support.f5.com/kb/en-us/products/big-ip_asm/releasenotes/product/relnote-asm-12-0-0.html>.

F5 Networks Inc., "BIG-IP Application Security Manager Operations Guide", Manual, Feb. 5, 2016, pp. 1-98, F5 Networks, Inc., Retrieved from the Internet<https://support.f5.com/kb/en-us/products/big-ip_asm/manuals/product/f5-asm-operations-guide.html>.

F5 Networks Inc., "BIG-IP® Local Traffic Management: Basics", Manual, Mar. 17, 2016, pp. 1-68, vol. 12.0, F5 Networks, Inc.

F5 Networks Inc., "F5 BIG-IP TMOS: Operations Guide", Manual, Mar. 5, 2015, pp. 1-236, F5 Networks, Inc., Retrieved from the Internet<https://support.f5.com/kb/en-us/products/big-ip_ltm/manuals/product/f5-tmos-operations-guide.html>.

F5 Networks Inc., "BIG-IP® Application Security Manager™: Implementations", Manual, Sep. 28, 2017, pp. 1-372, vol. 12.0, F5 Networks, Inc., Retrieved from the Internet<https://support.f5.com/kb/en-us/products/big-ip_asm/manuals/product/ams-implementations-12-0-0.html>.

F5 Networks Inc., "BIG-IP® TMOS: Implementations", Manual, Dec. 21, 2015, pp. 1-280, vol. 12.0, F5 Networks, Inc., Retrieved from the Internet<hhttps://support.f5.com/kb/en-us/products/big-ip_ltm/manuals/product/tmos-implementations-12-0-0.html>.

"A Process for Selective Routing of Servlet Content to Transcoding Modules," Research Disclosure 422124, Jun. 1999, pp. 889-890, IBM Corporation.

"BIG-IP Controller with Exclusive OneConnect Content Switching Feature Provides a Breakthrough System for Maximizing Server and Network Performance," F5 Networks, Inc. Press Release, May 8, 2001, 2 pages, Las Vegas, Nevada.

"Diameter MBLB Support Phase 2: Generic Message Based Load Balancing (GMBLB)", pp. 1-10, <https://peterpan.f5net.com/twiki/bin/view/TMOS/TMOSDiameterMBLB>, last accessed Mar. 29, 2010.

"Market Research & Releases, CMPP PoC documentation", <http://mainstreet/sites/PD/Teams/ProdMgmt/MarketResearch/Universal>, last accessed Mar. 29, 2010.

"Market Research & Releases, Solstice Diameter Requirements", <http://mainstreet/sites/PD/Teams/ProdMgmt/MarketResearch/Universal>, last accessed Mar. 29, 2010.

"Respond to server depending on TCP::client_port", pp. 1-6, DevCentral Forums iRules, <http://devcentral.f5.com/Default.aspx?tabid=53&forumid=5&tpage=1&v>, last accessed Mar. 26, 2010.

"Servlet/Applet/HTML authentication process with single sign-on," Research Disclosure 429128, Jan. 2000, pp. 163-164, IBM Corporation.

"Traffic Surges; Surge Queue; Netscaler Defense," 2005, PowerPoint Presentation, slides 1-12, Citrix Systems, Inc.

"UDDI Overview", Sep. 6, 2000, pp. 1-21, uddi.org (http://www.uddi.org/).

"UDDI Technical White Paper," Sep. 6, 2000, pp. 1-12, uddi-org, (http://www.uddi.org/).

"UDDI Version 3.0.1 UDDI Spec Technical Committee Specification", Oct. 14, 2003, pp. 1-383, uddi.org, (http://www.uddi.org/).

"Windows Server 2003 Kerberos Extensions," Microsoft TechNet, 2003 (Updated Jul. 31, 2004), http;//technet.microsoft.com/en-us/library/cc738207, Microsoft Corporation.

Abad, C., et al. "An Analysis on the Schemes for Detecting and Preventing ARP Cache Poisoning Attacks", IEEE, Computer Society, 27th International Conference on Distributed Computing Systems Workshops (ICDCSW'07), 2007, pp. 1-8.

ASP.NET Forums, "How to Remove Cookie Sessionid from Outgoing Response?," at Microsoft ASP.NET, pp. 1-4 (Dec. 2009).

Baer, T., et al., "The elements of Web services" ADTmag.com, Dec. 1, 2002, pp. 1-6, (http://www.adtmag.com).

Blake-Wilson et al., "Transport Layer Security (TLS) Extensions," (Apr. 2006).

Blue Coat, "Technology Primer; CIFS Protocol Optimization," Blue Coat Systems, Inc., 2007, pp. 1-3, (http://www.bluecoat.com).

Chou, Wesley, "Inside SSL: Accelerating Secure Transactions", IEEE(2002).

Crescendo Networks, "Application Layer Processing (ALP)," 2003-2009, pp. 168-186, Chapter 9, CN-5000E/5500E, Foxit Software Company.

Eastlake, 3rd Huawei D, "Transport Layer Security (TLS) Extensions: Extension Definitions," RFC:6066 pp. 1-25 (Jan. 18, 2011).

F5 Networks Inc., "3-DNS® Reference Guide, version 4.5", F5 Networks Inc., Sep. 202, pp. 2-1-2-28, 3-1-3-12, 5-1-5-24, Seattle Washington (2002).

F5 Networks Inc., "Big-IP® Reference Guide, version 4.5", F5 Networks Inc., Sep. 2002, pp. 11-1-11-32, Seattle Washington.

F5 Networks Inc., "Case Information Log for 'Issues with BoNY upgrade to 4.3'", as early as Feb. 2008.

F5 Networks Inc., "Configuration Guide for Local Traffic Management," F5 Networks Inc., Jan. 2006, version 9.2.2, 406 pgs.

"Deploying the BIG-IP-LTM for Diameter Load Balancing", Deployment Guide, Version 1.0, Sep. 2010, 21 pages.

F5 Networks Inc., F5 Diameter RM, PowerPoint document, Jul. 16, 2009, pp. 1-7.

F5 Networks Inc., "F5 WANJet CIFS Acceleration", White Paper, F5 Networks Inc., Mar. 2006, pp. 1-5, Seattle, Washington.

F5 Networks Inc., "Routing Global Internet Users to the Appropriate Data Center and Applications Using F5's 3-DNS Controller", F5 Networks Inc., Aug. 2001, pp. 1-4, Seattle Washington, (http://www.f5.com/f5products/3dns/relatedMaterials/Using/F5.html).

F5 Networks Inc., "Using F5's-DNS Controller to Provide High Availability Between Two or More Data Centers", F5 Networks Inc., Aug. 2001, pp. 1-4, Seattle, Washington, (http://www.f5.com/f5products/3dns/relatedMaterials/3DNSRouting.html).

F5 Networks, "BIG-IP® Local Traffic Manager™: Concept," Version 11.1, retrieved from Internet: URL:http//support.f5.com/content/kb/en-us/products/big-ip_ltm/manuals/product/ltm-concepts-11-1-0/_jcr_content/pdfAttach/download/file.res/ltm-concepts-11-1-0.pdf retrieved on Apr. 3, 2013] Sections 1, 2, 5, and 11 (Nov. 10, 2011).

F5 Networks, "Configuration Guide for BIG-IP Global Traffic Manager", version 10.2, Oct. 21, 2011, pp. 1-350, https://support.f5.com/content/kb/en-us/products/big-ip_gtm/manuals/product/gtm_config_10_2/_jcr_content/pdfAttach/download/file.res/Configuration_Guidefor_BIG-IP_Global_Traffic_Manager.pdf.

F5 Networks, Inc., "F5 and VMware Integration Streamlines App Provisioning Process", F5 Networks Inc., Solution Overview, Jun. 24, 2013, pp. 1-2, <www.f5.com>.

(56) References Cited

OTHER PUBLICATIONS

Fajardo, Victor I., "Open Diameter Software Architecture," Jun. 25, 2004, pp. 1-6, Version 1.0.7, http://diameter.sourceforge.net/diameter-architecture/index.html.
Fielding et al., "Hypertext Transfer Protocol—HTTP/1.1," Network Working Group, RFC: 2068, Jan. 1997, pp. 1-162.
Fielding et al., "Hypertext Transfer Protocol—HTTP/1.1," Network Working Group, RFC: 2616, Jun. 1999, pp. 1-176, The Internet Society.
Floyd et al., "Random Early Detection Gateways for Congestion Avoidance," Aug. 1993, pp. 1-22, IEEE/ACM Transactions on Networking, California.
Greenicicle, "Using the Silverlight HttpClient in WCF, and Still Passing Cookies," at http://greenicicleblog.com, pp. 1-8 (Oct. 2009).
Gupta et al., "Algorithms for Packet Classification", Computer Systems Laboratory, Stanford University, CA, Mar./Apr. 2001, pp. 1-29.
Heinz G., "Priorities in Stream Transmission Control Protocol (SCTP) Multistreaming", Thesis submitted to the Faculty of the University of Delaware, Spring 2003, pp. 1-35.
Hochmuth, Phil, "F5, CacheFlow pump up content-delivery lines," Network World Fusion, May 4, 2001, 1 page, Las Vegas, Nevada.
Ilvesmaki M., et al., "On the capabilities of application level traffic measurements to differentiate and classify Internet traffic," Presented in SPIE's International Symposium IT.com, Aug. 19-21, 2001, pp. 1-11, Denver, Colorado.
Imperva, "Imperva Technical Brief; SecureSphere and the OWASP Top Ten," Imperva US Headquarters, Foster City, CA (3 pages) (2008).
IMPERVA, "Web Application Firewall," IMPERVA Headquarters, Redwood Shores, CA (4 pages) (2010).
International Search Report and Written Opinion for International Patent Application No. PCT/US2013/026615, dated Jul. 4, 2013.
International Search Report and Written Opinion for International Patent Application No. PCT/US2013/026262 (dated May 17, 2013).
Internet Protocol, "DARPA Internet Program Protocol Specification," (RFC:791), Information Sciences Institute, University of Southern California, Sep. 1981, pp. 1-49.
Kawamoto D., "Amazon files for Web services patent", CNET News.com, Jul. 28, 2005, pp. 1-2, (http://news.com).
Lamonica M., "Infravio spiffs up Web services registry idea", CNET News.com, May 11, 2004, pp. 1-2, (http://www.news.com).
Mac Vittie, Lori, "Message-Based Load Balancing: Using F5 solutions to address the challenges of scaling Diameter, RADIUS, and message-oriented protocols", F5 Technical Brief, 2005, pp. 1-9, F5 Networks, Inc., Seattle, WA.
MacVittie, L. "Cloud Balancing: The Evolution of Global Server Load Balancing", White Paper, F5 Networks, Inc., Nov. 2, 2012, pp. 1-12.
Macvittie, Lori, "Message-Based Load Balancing," Technical Brief, Jan. 2010, pp. 1-9, F5 Networks, Inc.
Masone et al., "WSKE: Web Server Key Enabled Cookies," Department of Computer Science, Dartmouth College, Hanover, NH (13 pages) (2007).
Miller, "Persistent Login Cookie Best Practice," The Fishbowl Weblog at http://fishbowl.patiche.org/, pp. 1-6 (2004).
Modiano E., "Scheduling Algorithms for Message Transmission Over a Satellite Broadcast System", MIT Lincoln Laboratory Advanced Network Group, Nov. 1997, pp. 1-7.
Murdoch, "Hardened Stateless Session Cookies," University of Cambridge, Computer Laboratory, pp. 1-9 (Apr. 2008).
NET, "Get MAC for Remote Computer," NET Framework Developer Center at http://msdn.microsoft.com/en-us/netframework/aa496123.aspx, pp. 1-2 (2008).
Nichols K., et al., "Definition of the Differentiated Services Field (DS Field) in the IPv4 and IPv6 Headers", (RFC:2474) Network Working Group, Dec. 1998, pp. 1-19, (http://ietf.org/rfc/rfc2474.txt).
Oracle, "Configuring Oracle Web Cache for Session Binding and Load Balancing," Oracle Technology Network at http://www.oracle.com/technology/index.html, pp. 1-6 (2004).
Ott D., et al., "A Mechanism for TCP-Friendly Transport-level Protocol Coordination", USENIX Annual Technical Conference, 2002, University of North Carolina at Chapel Hill, pp. 1-12.
OWASP, "Testing for Cross site scripting", OWASP Testing Guide v2, Table of Contents, Feb. 24, 2011, pp. 1-5, (www.owasp.org/index.php/Testing_for_Cross_site_scripting).
Padmanabhan V., et al., "Using Predictive Prefetching to Improve World Wide Web Latency", SIGCOM, 1996, pp. 10-15.
Prosise, "Foiling Session Hijacking Attempts," msdn, Wicked Code at http://msdn.microsoft.com/en-us/magazine/default.aspx, pp. 1-6 (Jul. 2004).
Rosen E., et al., "MPLS Label Stack Encoding", (RFC:3032) Network Working Group, Jan. 2001, pp. 1-22, (http://www.ietf.org/rfc/rfc3032.txt).
Schaefer, Ken, "IIS and Kerberos Part 5—Protocol Transition, Constrained Delegation, S4U2S and S402P," Jul. 18, 2007, 21 pages, http://www.adopenstatic.com/cs/blogs/ken/archive/2007/07/19/8460.aspx.
Schilit B., "Bootstrapping Location-Enhanced Web Services", University of Washington, Dec. 4, 2003, (http://www.cs.washington.edu/news/cooloq.info.html).
Seeley R., "Can Infravio technology revive UDDI?", ADTmag.com, Oct. 22, 2003, (http://adtmag.com).
Shohoud Y., "Building XML Web Services with VB .NET and VB 6", Addison Wesley, 2002, pp. 1-14.
Sleeper B., "The Evolution of UDDI: UDDI.org White Paper", the Stencil Group, Inc., Jul. 19, 2002, pp. 1-15, San Francisco, California.
Sleeper B., "Why UDDi Will Succeed, Quietly: Two Factors Push Web Services Forward", The Stencil Group, Inc., Apr. 2001, pp. 1-7, San Francisco, California.
Sommers F., "Whats New in UDDI 3.0—Part 1", Web Services Papers, Jan. 27, 2003, pp. 1-14, (http://www.webservices.org/index.php/article/articleprint/871/-1/24/.
Sommers F., "Whats New in UDDI 3.0—Part 2", Web Services Papers, Mar. 2, 2003, pp. 1-8, (http://www.web.archive.org/web/20040620131006/).
Sommers F., "Whats New in UDDI 3.0—Part 3", Web Services Papers, Sep. 2, 2003, pp. 1-4, (http://www.webservices.org/index.php/article/articleprint/894/-1/24).
Supportwiki, "Web: Cookies," from SupportWiki at http://wiki.livejournal.org/index.php/Main_Page, pp. 1-3 (Feb. 2008).
Tridgell et al., "rsync," retrieved from http://en.wilipedia.org/wiki/Rsync, 7 pages (Jan. 27, 2012).
Varjabedian, "Bullet Proof Cookies," ASP.NET Web Development CodeProject at http://www.codeproject.com, pp. 1-6 (2007).
Wang B., "Priority and realtime data transfer over the best-effort Internet", Dissertation Abstract, 205, ScholarWorks@UMASS (2005).
Wikipedia, "Diameter (protocol)" pp. 1-11, <http://en.wikipedia.org/wiki/Diamter_(protocol)>, last accessed Oct. 27, 2010.
Wilkes, S., "Automating F5 Application Services for WMware with F5 BIG-IQ Cloud", F5 Networks, Inc., White Paper, Apr. 26, 2013, pp. 1-9, <www.f5.com>.
Williams et al., "Forwarding Authentication," The Ultimate Windows Server 2003 System Administrator's Guide, 2003, 2 pages, Figure 10.7, Addison-Wesley Professional, Boston, Massachusetts.
Woo T.Y.C., "A Modular Approach to Packet Classification: Algorithms and Results", Bell Laboratories, Lucent Technologies, Mar. 2000, pp. 1-10.

\* cited by examiner

METHODS FOR FACILITATING CIPHER SELECTION AND DEVICES THEREOF

This application claims the benefit of U.S. Provisional Patent Application Ser. No. 62/415,607 filed Nov. 1, 2016, which is hereby incorporated by reference in its entirety.

FIELD

This technology generally relates to network security and, more particularly, to facilitating improved cipher selection.

BACKGROUND

Prior to constructing a secure channel with Transport Layer Security (TLS)/Secure Sockets Layer (SSL) (referred to herein as SSL), network devices must exchange and agree upon a number of security parameters in order to provide confidentiality, authentication, and message integrity. Security parameters presented for negotiating secure network sessions are represented in a string referred to as a cipher suite. Ciphers suites can have any number of associated attributes and belong to one or more cipher suite sets (e.g., Perfect Forward Secrecy (PFS) or Federal Information Processing Standard (FIPS) cipher suite sets).

As one exemplary device, network traffic management apparatuses can facilitate SSL sessions with and between both client devices and server devices in some implementations. Network traffic management apparatuses also can implement security policies to protect server devices, and, in particular, applications hosted on the server devices, from malicious network traffic. Previously, in order to configure SSL on network traffic management apparatuses, an administrator had to translate security policies (e.g., for the applications hosted on the server devices) into a text-based list of cipher suites, ordered based on priority, which is referred to herein as a cipher string.

However, significant knowledge of cryptography is generally required in order to determine whether selected cipher suites are secure enough to meet security policy requirements, are hardware accelerated, support particular web browsers, or enable specific features (e.g., PFS), for example. Accordingly, generating cipher strings is currently a complex process that is error-prone, and often results in cipher strings that are not aligned with security policies, leading to vulnerabilities that can be exploited by malicious actors.

SUMMARY

A method for facilitating improved cipher selection implemented by a network traffic management system comprising one or more network traffic management apparatuses, administrator devices, client devices, or server devices, the method including obtaining one or more custom selection rules and one or more custom priority rules via a graphical user interface (GUI). One or more of the custom selection rules are applied to a cipher suite database to generate a result set of cipher suites. The cipher suite database includes a plurality of cipher suite sets. One or more of the custom priority rules are applied to the result set of cipher suites to generate an ordered result set of cipher suites. A cipher string is generated based on the ordered result set of cipher suites. The cipher string is stored in a secure socket layer (SSL) profile to be used during negotiation of secure network sessions.

A network traffic management apparatus, comprising memory comprising programmed instructions stored thereon and one or more processors configured to be capable of executing the stored programmed instructions to obtain one or more custom selection rules and one or more custom priority rules via a GUI. One or more of the custom selection rules are applied to a cipher suite database to generate a result set of cipher suites. The cipher suite database includes a plurality of cipher suite sets. One or more of the custom priority rules are applied to the result set of cipher suites to generate an ordered result set of cipher suites. A cipher string is generated based on the ordered result set of cipher suites. The cipher string is stored in a SSL profile to be used during negotiation of secure network sessions.

A non-transitory computer readable medium having stored thereon instructions for facilitating improved cipher selection comprising executable code which when executed by one or more processors, causes the processors to obtain one or more custom selection rules and one or more custom priority rules via a GUI. One or more of the custom selection rules are applied to a cipher suite database to generate a result set of cipher suites. The cipher suite database includes a plurality of cipher suite sets. One or more of the custom priority rules are applied to the result set of cipher suites to generate an ordered result set of cipher suites. A cipher string is generated based on the ordered result set of cipher suites. The cipher string is stored in a SSL profile to be used during negotiation of secure network sessions.

A network traffic management system, comprising one or more network traffic management apparatuses, administrator devices, client devices, or server devices, the network traffic management system comprising memory comprising programmed instructions stored thereon and one or more processors configured to be capable of executing the stored programmed instructions to obtain one or more custom selection rules and one or more custom priority rules via a GUI. One or more of the custom selection rules are applied to a cipher suite database to generate a result set of cipher suites. The cipher suite database includes a plurality of cipher suite sets. One or more of the custom priority rules are applied to the result set of cipher suites to generate an ordered result set of cipher suites. A cipher string is generated based on the ordered result set of cipher suites. The cipher string is stored in a SSL profile to be used during negotiation of secure network sessions.

This technology has a number of associated advantages including providing methods, non-transitory computer readable media, network traffic management apparatuses, and network traffic management systems that facilitate more accurate cipher strings, resulting in improved network security. With this technology, custom selection and priority rules are used to more effectively facilitate generation of cipher strings. The custom selection rules advantageously support multiple constraints simultaneously, as well as exclusion of certain sets of cipher suites sharing particular attributes. Accordingly, this technology allows administrators to establish SSL configurations with cipher strings in a more efficient and accurate manner.

DETAILED DESCRIPTION

Figure 1:
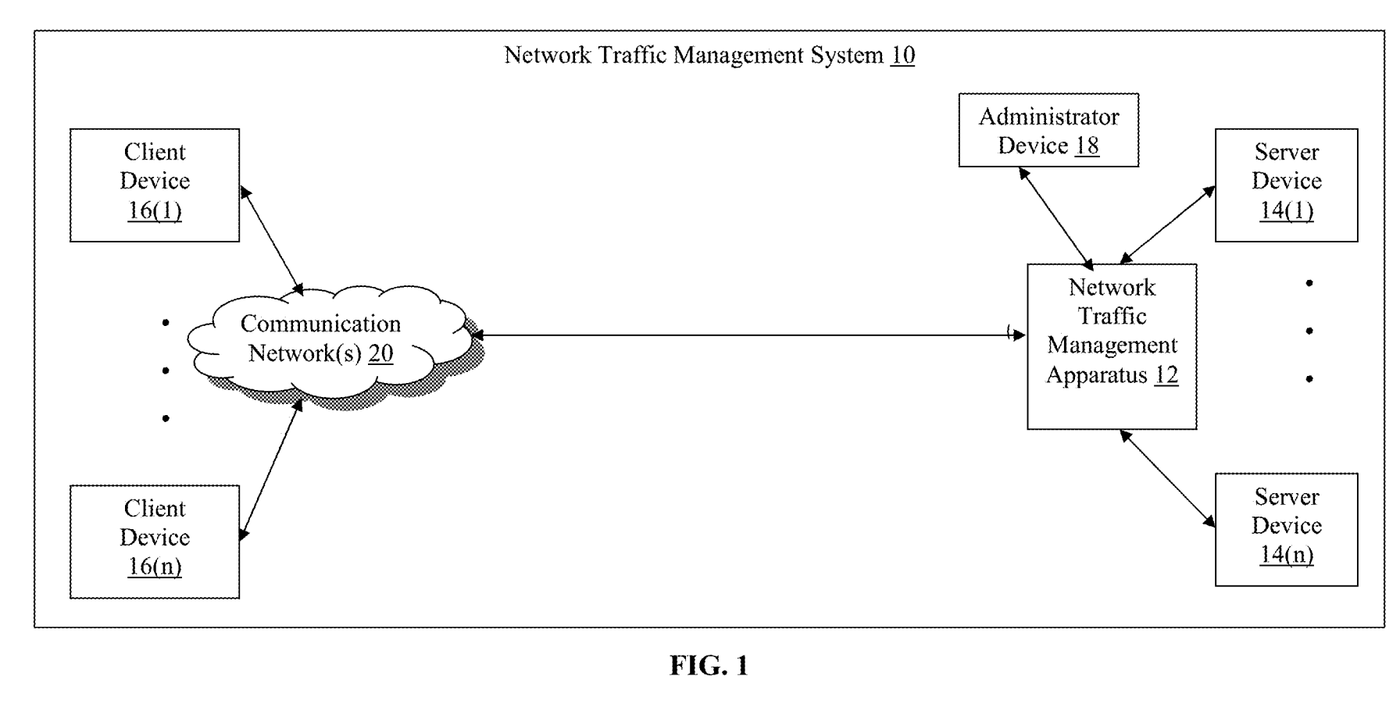
FIG. 1 is a block diagram of an exemplary network traffic management system with an network traffic management apparatus.

Referring to FIG. 1, an exemplary network environment which incorporates an exemplary network traffic management system 10 is illustrated. The network traffic management system 10 in this example includes a network traffic management apparatus 12 that is coupled to a plurality of server devices 14(1)-14(n), a plurality of client devices 16(1)-16(n), and an administrator device 18 via communication network(s), although the network traffic management apparatus 12, server devices 14(1)-14(n), client devices 16(1)-16(n), and/or administrator device 18 may be coupled together via other topologies. Additionally, the network traffic management system 10 may include other network devices such as one or more routers and/or switches, for example, which are well known in the art and thus will not be described herein. This technology provides a number of advantages including methods, non-transitory computer readable media, network traffic management systems, and network traffic management apparatuses that more efficiently and accurately generate SSL configurations that include cipher strings, and thereby improve network security.

Figure 2:
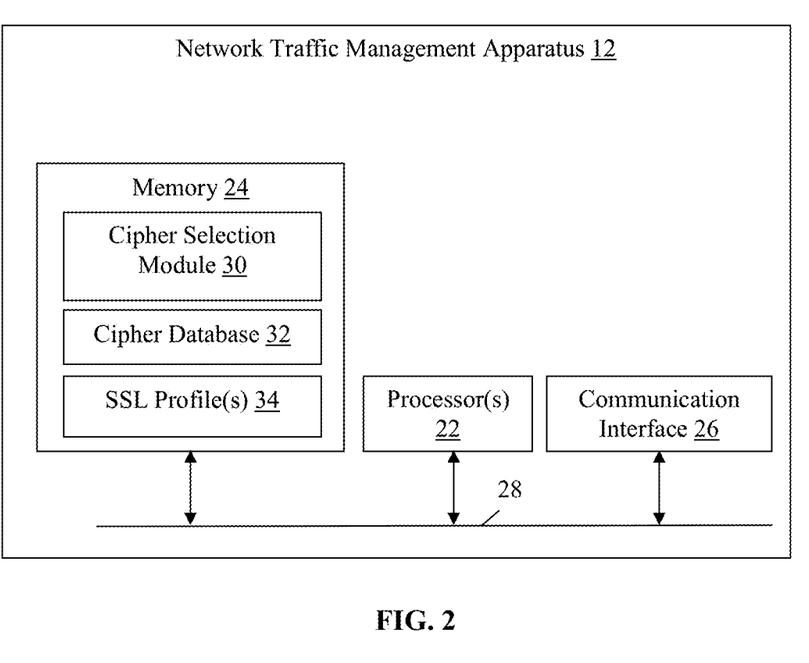
FIG. 2 is a block diagram of an exemplary network traffic management apparatus.

Referring to FIGS. 1-2, the network traffic management apparatus 12 of the network traffic management system 10 may perform any number of functions including managing network traffic, load balancing network traffic across the server devices 14(1)-14(n), accelerating network traffic associated with web applications hosted by the server devices 14(1)-14(n), or providing firewall and other security services on behalf of the server devices 14 (1)-14(n) and applications hosted thereon. The network traffic management apparatus 12 in this example includes one or more processors 22, a memory 24, and/or a communication interface 26, which are coupled together by a bus 28 or other communication link, although the network traffic management apparatus 12 can also include other types and/or numbers of elements in other configurations.

The processor(s) 22 of the network traffic management apparatus 12 may execute programmed instructions stored in the memory 24 of the network traffic management apparatus 12 for the any number of the functions identified above. The processor(s) 22 of the network traffic management apparatus 12 may include one or more CPUs or general purpose processors with one or more processing cores, for example, although other types of processor(s) can also be used.

The memory 24 of the network traffic management apparatus 12 stores these programmed instructions for one or more aspects of the present technology as described and illustrated herein, although some or all of the programmed instructions could be stored elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s), can be used for the memory 24.

Figure 3:
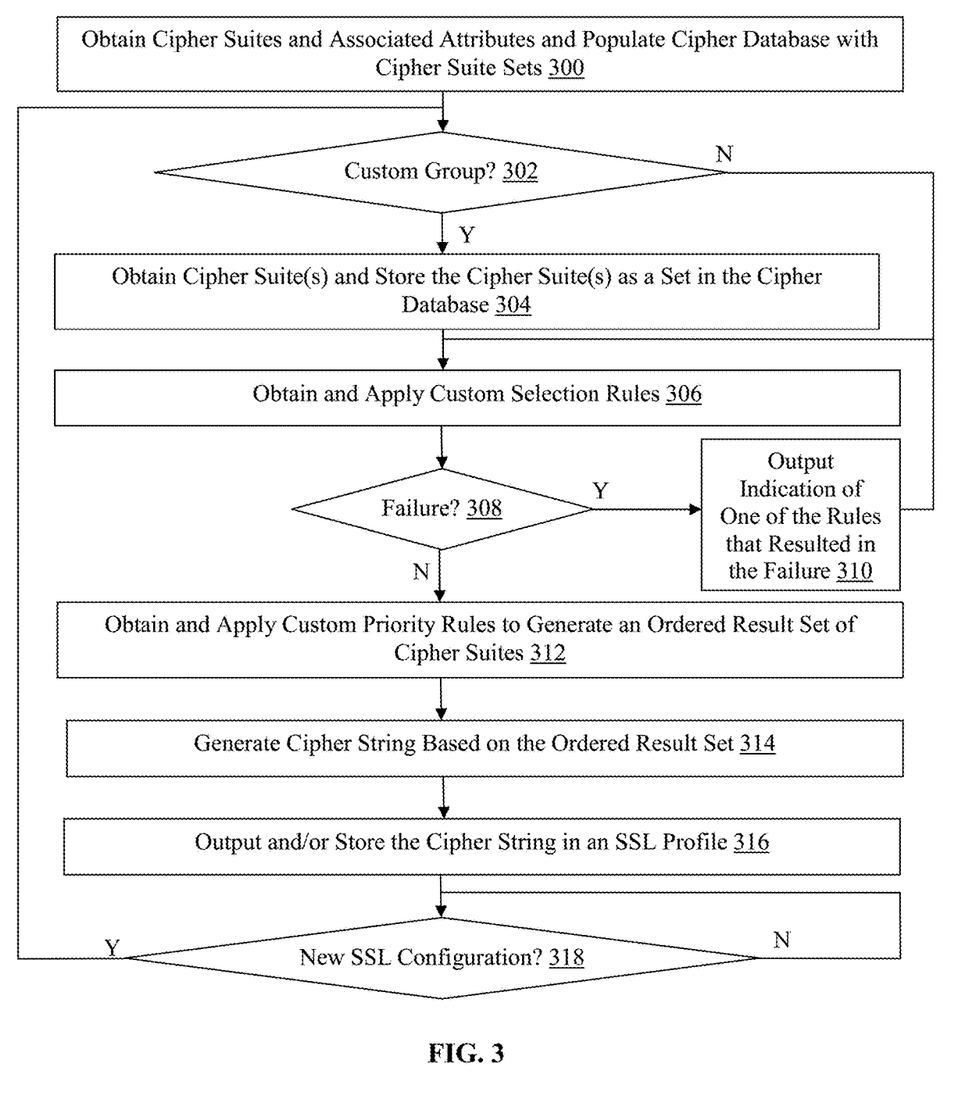
FIG. 3 is a flowchart of an exemplary method for facilitating cipher selection.

Accordingly, the memory 24 of the network traffic management apparatus 12 can store one or more applications that can include computer executable instructions that, when executed by the network traffic management apparatus 12, cause the network traffic management apparatus 12 to perform actions, such as to transmit, receive, or otherwise process messages, for example, and to perform other actions described and illustrated below with reference to FIGS. 3-5. The application(s) can be implemented as modules or components of other applications. Further, the application(s) can be implemented as operating system extensions, module, plugins, or the like.

Even further, the application(s) may be operative in a cloud-based computing environment. The application(s) can be executed within or as virtual machine(s) or virtual server(s) that may be managed in a cloud-based computing environment. Also, the application(s), and even the network traffic management apparatus 12 itself, may be located in virtual server(s) running in a cloud-based computing environment rather than being tied to one or more specific physical network computing devices. Also, the application(s) may be running in one or more virtual machines (VMs) executing on the network traffic management apparatus 12. Additionally, in one or more embodiments of this technology, virtual machine(s) running on the network traffic management apparatus 12 may be managed or supervised by a hypervisor.

In this particular example, the memory 24 of the network traffic management apparatus 12 includes a cipher selection module 30, a cipher database 32, and SSL profile(s) 34, although the memory 24 can include other policies, modules, databases, or applications, for example. The cipher selection module 30 is configured to generate graphical user interfaces (GUIs) for facilitating the submission of custom selection and priority rules and the generation of cipher strings. The GUIs can be provided to the administrator device 18, for example, and allow an administrator to more effectively generate cipher strings that are aligned with security policies for applications hosted by the server devices 14(1)-14(n).

The cipher database 32 stores a plurality of cipher suites, optionally organized as cipher suite sets. The cipher database 32 further includes attributes associated with each of the cipher suite sets that are shared by the cipher suites that comprise the cipher suite sets, and/or attributes associated with each of the cipher suites separate from those of an associated cipher suite set, for example. The cipher database 32 can also store custom groups of cipher suites that may be generated by the cipher selection module 30, for example. Accordingly, the cipher selection module 30 can use the cipher database 32 to apply custom selection rules in order to identify the cipher suites to include in a cipher string for a configuration, as described and illustrated in more detail later.

The SSL profile(s) 34 store configurations including cipher strings that may be application or operating system specific, for example. The SSL profile(s) 34 are used by the network traffic management apparatus 12 when negotiating secure channels or SSL sessions with other network devices, such as one of the client devices 16(1)-16(n) or server devices 14(1)-14(n), for example. Accordingly, the cipher selection module 30 can output a cipher string that is stored in one of the SSL profile(s) 34 associated with an application hosted by one of the server devices 14(1)-14(n), for example, and used to facilitate communication with the application via SSL sessions.

In another example, one or more of the SSL profile(s) 34 can reference a set of rules that, when executed, can establish the configuration of cipher suites to be implemented. In this example, the rules facilitate more efficient on-going management based on rule and/or cipher database 32 updates as compared to one or more of the SSL profile(s) 34 that merely include the output from a single execution of rules (e.g., an ordered result set of cipher suites).

The communication interface 26 of the network traffic management apparatus 12 operatively couples and communicates between the network traffic management apparatus 12, the server devices 14(1)-14(n), the client devices 16(1)-16(n), and/or the administrator device 18, which are all coupled together by the communication network(s) 20, although other types and/or numbers of communication networks or systems with other types and/or numbers of connections and/or configurations to other devices and/or elements can also be used.

By way of example only, the communication network(s) 20 can include local area network(s) (LAN(s)) or wide area network(s) (WAN(s)), and can use TCP/IP over Ethernet and industry-standard protocols, although other types and/or numbers of protocols and/or communication networks can be used. The communication network(s) 20 in this example can employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like. The communication network(s) 20 can also include direct connection(s) (e.g., for when a device illustrated in FIG. 1, such as the network traffic management apparatus 12, one or more of the client devices 16(1)-16(n), one or more of the server devices 14(1)-14(n), or the administrator device 18 operate as virtual instances on the same physical machine).

While the network traffic management apparatus 12 is illustrated in this example as including a single device, the network traffic management apparatus 12 in other examples can include a plurality of devices or blades each having one or more processors (each processor with one or more processing cores) that implement one or more steps of this technology. In these examples, one or more of the devices can have a dedicated communication interface or memory. Alternatively, one or more of the devices can utilize the memory, communication interface, or other hardware or software components of one or more other devices included in the network traffic management apparatus 12.

Additionally, one or more of the devices that together comprise the network traffic management apparatus 12 in other examples can be standalone devices or integrated with one or more other devices or apparatuses, such as one of the server devices 14(1)-14(n), for example. Moreover, one or more of the devices of the network traffic management apparatus 12 in these examples can be in a same or a different communication network including one or more public, private, or cloud networks, for example.

Each of the server devices 14(1)-14(n) of the network traffic management system 10 in this example includes one or more processors, a memory, and a communication interface, which are coupled together by a bus or other communication link, although other numbers and/or types of network devices could be used. The server devices 14(1)-14(n) in this example process requests received from the client devices 16(1)-16(n) via the communication network(s) 20 according to the HTTP-based application RFC protocol, for example. Various applications may be operating on the server devices 14(1)-14(n) and transmitting data (e.g., files or Web pages) to the client devices 16(1)-16(n) via the network traffic management apparatus 12 in response to requests from the client devices 16(1)-16(n). The server devices 14(1)-14(n) may be hardware or software or may represent a system with multiple servers in a pool, which may include internal or external networks.

Although the server devices 14(1)-14(n) are illustrated as single devices, one or more actions of each of the server devices 14(1)-14(n) may be distributed across one or more distinct network computing devices that together comprise one or more of the server devices 14(1)-14(n). Moreover, the server devices 14(1)-14(n) are not limited to a particular configuration. Thus, the server devices 14(1)-14(n) may contain a plurality of network computing devices that operate using a master/slave approach, whereby one of the network computing devices of the server devices 14(1)-14(n) operate to manage and/or otherwise coordinate operations of the other network computing devices. The server devices 14(1)-14(n) may operate as a plurality of network computing devices within a cluster architecture, a peer-to peer architecture, virtual machines, or within a cloud architecture, for example.

Thus, the technology disclosed herein is not to be construed as being limited to a single environment and other configurations and architectures are also envisaged. For example, one or more of the server devices 14(1)-14(n) can operate within the network traffic management apparatus 12 itself rather than as a stand-alone server device communicating with the network traffic management apparatus 12 via the communication network(s) 20. In this example, the one or more server devices 14(1)-14(n) operate within the memory 24 of the network traffic management apparatus 12.

The client devices 16(1)-16(n) of the network traffic management system 10 in this example include any type of computing device that can request and receive content stored by the server devices 14(1)-14(n) over the communication network(s) 20 using SSL, such as mobile computing devices, desktop computing devices, laptop computing devices, tablet computing devices, virtual machines (including cloud-based computers), or the like. Each of the client devices 16(1)-16(n) in this example include a processor, a memory, and a communication interface, which are coupled together by a bus or other communication link, although other numbers and/or types of network devices could be used.

The client devices 16(1)-16(n) may run interface applications, such as standard web browsers or standalone client applications, which may provide an interface to make requests for, and receive content stored on, one or more of the server devices 14(1)-14(n) via the communication network(s) 10. The client devices 16(1)-16(n) may further include a display device, such as a display screen or touchscreen, and/or an input device, such as a keyboard for example.

The administrator device 18 in this example includes a processor, a memory, and a communication interface, which are coupled together by a bus or other communication link, although other numbers and types of network devices could be used. The administrator device 18 may also include an input device and a display device and may run interface applications, such as a web browser, that may provide an interface for an administrator to manipulate GUIs provided by the cipher selection module 30 of the network traffic management apparatus 12, for example, as described and illustrated in more detail later.

Although the exemplary network traffic management system 10 with the network traffic management apparatus 12, server devices 14(1)-14(n), client devices 16(1)-16(n), administrator device 18, and communication network(s) 20 are described and illustrated herein, other types and/or numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the components depicted in the network traffic management system 10, such as the network traffic management apparatus 12, server devices 14(1)-14(n), client devices 16(1)-16(n), or administrator device 18, for example, may be configured to operate as virtual instances on the same physical machine. In other words, one or more of the network traffic management apparatus 12, server devices 14(1)-14(n), client devices 16(1)-16(n), or administrator device 18 may operate on the same physical device rather than as separate devices communicating through communication network(s). Additionally, there may be more or fewer network traffic management apparatus, client devices, server devices, or administrator devices than illustrated in FIG. 1. The client devices 16(1)-16(n) could also be implemented as applications on the network traffic management apparatus 12 itself as a further example.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

An exemplary method of facilitating cipher selection will now be described with reference to FIGS. 1-5. Referring more specifically to FIG. 3, in step 300 in this example, the network traffic management apparatus 12 of the network traffic management system 10 obtains cipher suites and associated attributes and populates the cipher database 32 with sets of the cipher suites. The cipher suites and attributes can be obtained over the communication network(s) 10, from an administrator, and/or from a manufacturer as part of a default cipher database, for example. Each of the cipher suites is a string identifying authentication, encryption, message authentication code (MAC) and/or key exchange algorithm(s) used to negotiate security settings for a network connection using SSL.

The attributes can include compatible browsers, FIPS compliance, FPS compliance, hardware acceleration support, an indication of strength or performance, and/or other compatibility information, for example, although other types and numbers of attributes can also be obtained in step 300. Optionally, a plurality of the cipher suites can be part of a default cipher suite set that is associated with a set of one or more attributes (e.g., FIPS compliance) that is shared by each of the plurality of cipher suites in the cipher suite set. Accordingly, the cipher database 32 includes a plurality of cipher suite sets and associated attributes for each of the cipher suite sets and/or one or more cipher suites within one or more of the cipher suite sets.

In step 302, the network traffic management apparatus 12 optionally determines whether creation of a new custom group or updating of a current custom group has been initiated. In one example, the network traffic management apparatus 12 can provide a GUI to the administrator device 18 that facilitates creation and updating of a custom group of cipher suites. If the network traffic management apparatus 12 determines that creation of a new custom group or updating of a current custom group has been initiated, then the Yes branch is taken to step 304.

In step 304, the network traffic management apparatus 12 obtains via the GUI an indication of a plurality of cipher suites to be included in a new custom group or one or more cipher suites to be added to a current custom group. In one example, a list of cipher suites can be provided via the GUI and based on the contents of the cipher database 32, and a user of the administrator device 18 can select cipher suites from the list for inclusion in a new or current custom group. Upon submission of the new or updated custom group by a user of the administrator device 18, the network traffic management apparatus 12 stores the new or updated custom group comprising the selected cipher suites in the cipher database 32 as a cipher suite set.

Subsequent to storing the new or updated custom group in the cipher database 32, or if the network traffic management apparatus 12 determines that creation of a new custom group or updating of a current custom group has not been initiated and the No branch is taken from step 302, the network traffic management apparatus 12 proceeds to step 306. In step 306, the network traffic management apparatus 12 obtains and applies custom selection rule(s) to the cipher database 32 to generate a result set of cipher suites.

In this example, the custom selection rules include set operation(s) such as addition, subtraction, and intersection, as well as an indication of one or more of the cipher suites, cipher suite sets, and/or attributes in the cipher database 32. Accordingly, the rules can allow, restrict, and/or exclude cipher suites, based on their inclusion in particular cipher suite sets and/or their associated attributers in the cipher database 32, in order to generate a result set. Optionally, the custom selection rules can be based on a security policy for an application hosted by one of the server devices 14(1)-14(n).

Figure 4:
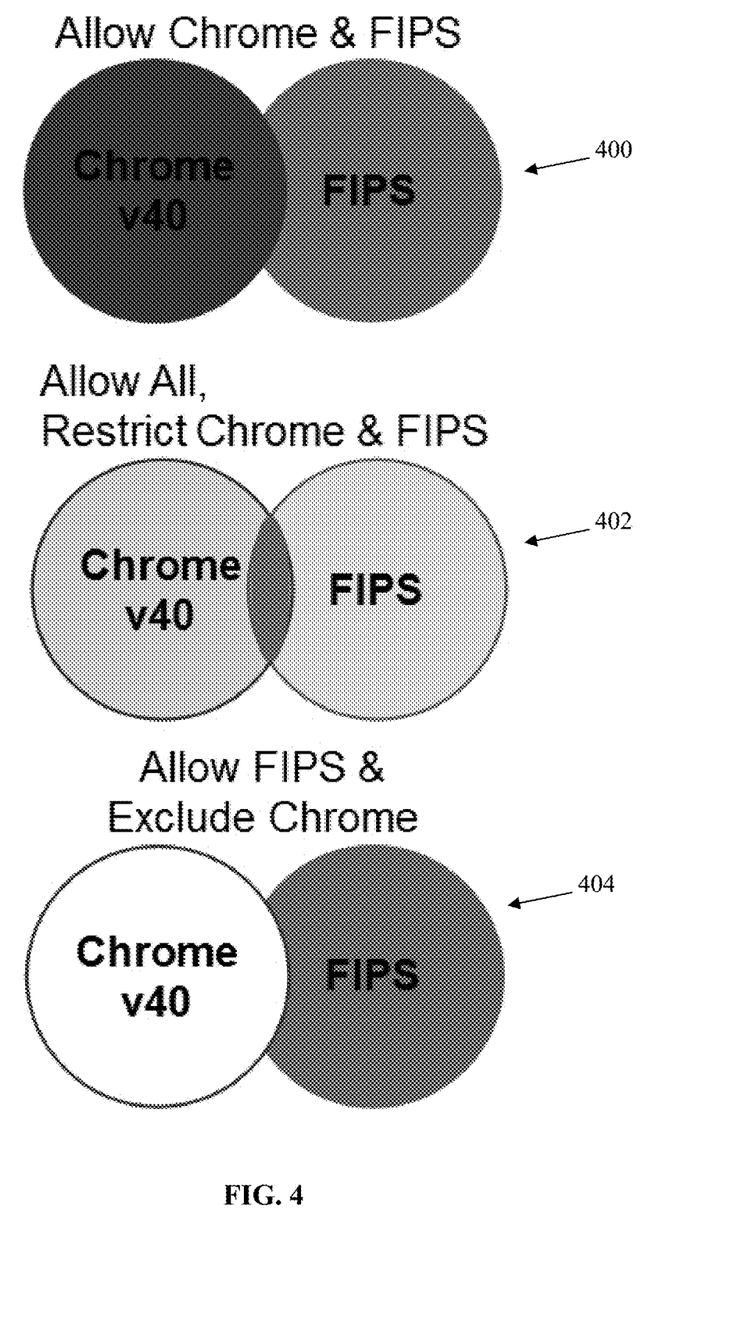
FIG. 4 is a set of diagrams illustrating custom selection rules for selecting cipher suites to be included in a cipher string.

Referring more specifically to FIG. 4, diagrams 400, 402, and 404 are shown illustrating custom selection rules for selecting cipher suites to be included in a cipher string. In this example, two cipher suite sets are stored in the cipher database 32 including a cipher suite set with cipher suites supporting the Chrome v40 web browser and a cipher suite set with cipher suites that are compatible with FIPS.

Accordingly, in a first diagram 400, application of an allow or addition rule will generate a result set with all of the cipher suites in both cipher suite sets. In a second diagram 402, application of an intersection or restriction rule will generate a result set with only those cipher suites that are in both cipher suite sets. In a third diagram 404, application of a subtraction or exclude rule will generate a result set with all of the cipher suites in the FIPS cipher suite set except those cipher suites that are also in the Chrome v40 cipher suite set. In other examples, the selection rules can be applied to particular attributes instead of cipher suite sets, and other types and number of custom selection rules can also be used in other examples.

Referring back to FIG. 3, in step 308, the network traffic management apparatus 12 determines when a failure has occurred in the application of the custom selection rules has occurred. In this example, the custom selection rules are applied in an order. Therefore, the network traffic management apparatus 12 can determine the point during the application of the custom selection rules in which the result set becomes null, and the associated one of the custom selection rules that, when applied, resulted in the null set of cipher suites.

If the network traffic management apparatus 12 determines that a failure has occurred in the application of the custom selection rules, then the No branch is taken to step 310. In step 310, the network traffic management apparatus 12 optionally outputs an indication of the one of the custom selection rules that resulted in the failure. The indication can be output to the administrator device 18 via the GUI, for example, although other types of outputs and notification methods can also be used. Subsequent to outputting the indication, the network traffic management apparatus 12 proceeds back to step 306 and again obtains and applies custom selection rules from the administrator in order to address the failure.

Referring back to step 308, if the network traffic management apparatus 12 determines that a failure has not occurred, then the No branch is taken to step 312. In step 312, the network traffic management apparatus 12 obtains and applies custom priority rules to generate an ordered result set of cipher suites. The ordering of cipher suites in the result set, and generated cipher string, reflects a preference that is expressed during a negotiation of an SSL connection.

The custom priority rules can be obtained via a GUI provided to the administrator device 18, for example, and can include a recitation of cipher suite sets or attributes and their relative priorities. In one example, a custom priority rule might indicate that support for hardware acceleration is prioritized over FIPS compliance, which is prioritized over PFS compliance, for example. In this example, the network traffic management apparatus 12 applies the custom priority rules to the result set of cipher suites generated in step 306 based on the association in the cipher database 32 of the cipher suites of the result set with cipher suite sets or attributes identified in the custom priority rules. Other types and numbers of custom priority rules, and other methods for applying the custom priority rules, can also be used in other examples.

In step 314, the network traffic management apparatus 12 generates a cipher string based on the ordered result set generated in step 312. Accordingly, the cipher string is a text-based string that identifies cipher suite(s) resulting from the application of the custom selection and priority rules obtained and applied in steps 306 and 312, respectively.

In step 316, the network traffic management apparatus 12 outputs and/or stores the cipher string generated in step 314 in one of the SSL profiles. The cipher string can be output via a GUI provided to the administrator device 18, for example, which facilitates visibility, backward compatibility, and copy-paste functionality with respect to the cipher string. By storing the cipher string in one of the SSL profiles, the cipher string will be utilized when negotiating SSL connections on behalf of an associated application hosted by one of the server devices 14(1)-14(n).

Figure 5:
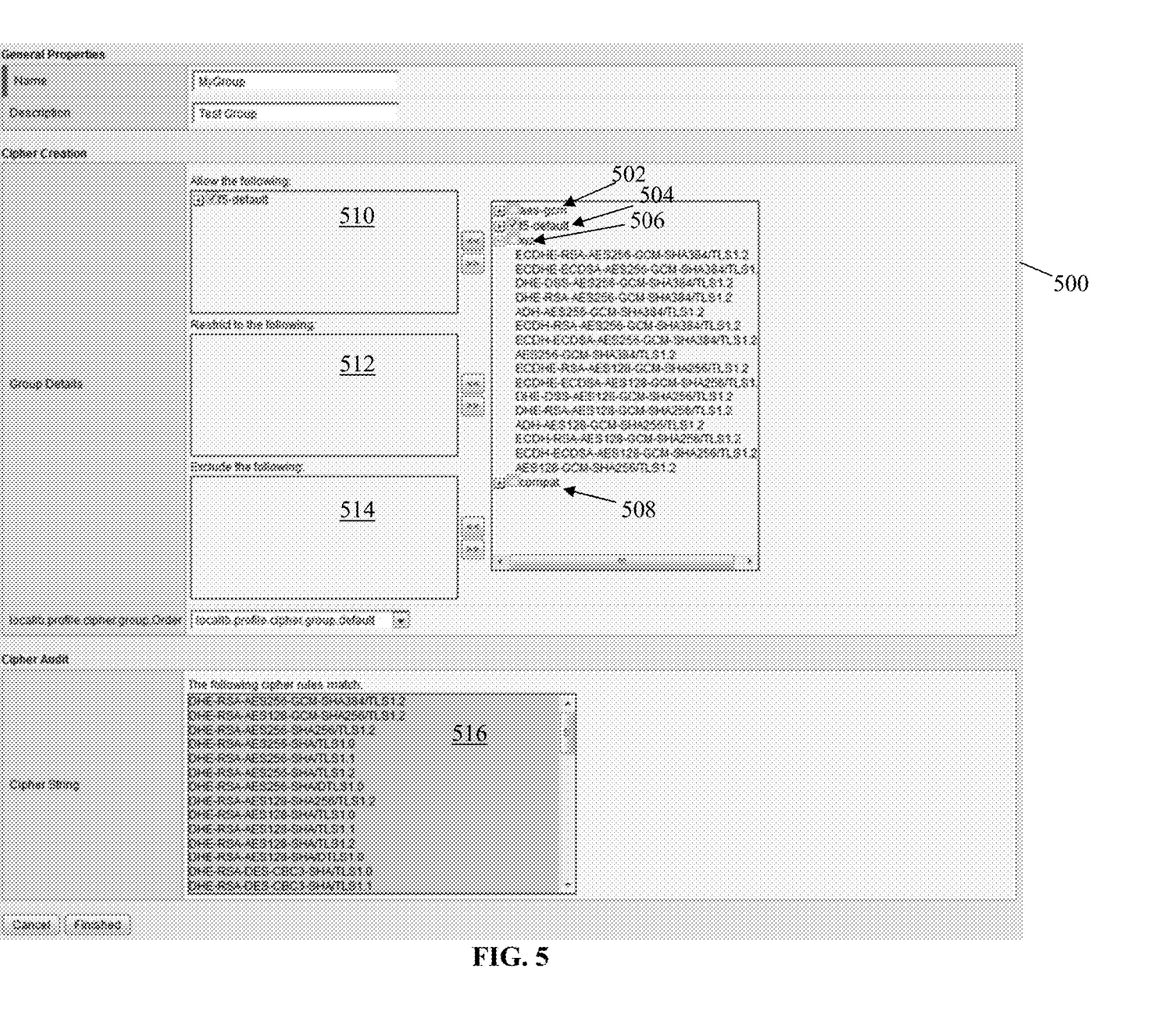
FIG. 5 is an exemplary interface for obtaining custom selection rules and outputting a result set as a cipher string.

Referring more specifically to FIG. 5, an exemplary interface 500 for obtaining custom selection rules and outputting a result set as a cipher string is shown. In this example, there are four custom groups or cipher suite sets 502, 504, 506, and 508, which can be expanded to show the cipher suites that are included in those sets. Three boxes 510, 512, and 514 facilitate allow, restrict, and exclude custom selection rules, respectively. Accordingly, cipher suite sets or individual cipher suites can be moved to one of the boxes 510, 512, and 514 associated with one of the rules, initiating an application of one or more custom priority rules and an output or update to the cipher string in a bottom panel 516. Other types of interfaces or GUIs for facilitating cipher selection according to this technology can also be used in other examples.

Referring back to FIG. 3, in step 318, the network traffic management apparatus 12 determines whether creation of a new SSL configuration or cipher string has been requested. If the network traffic management apparatus 12 determines that the creation of a new SSL configuration has not been initiated, such as for another application hosted by one of the server devices 14(1)-14(n), then the No branch is taken back to step 318 and the network traffic management apparatus 12 effectively waits for the initiation of a new SSL configurations. However, if the network traffic management apparatus 12 determines in step 318 that creation of a new SSL configuration has been initiated, then the Yes branch is taken back to step 302 in this example.

With this technology, custom selection and priority rules more effectively facilitate generation of cipher strings. In particular, the custom selection rules support multiple constraints simultaneously, as well as exclusion of certain sets of cipher suites sharing particular attributes. Accordingly, this technology allows administrators to establish SSL configurations with cipher strings in a more efficient manner with fewer errors, resulting in increased network security.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A computer implemented method, executed by one or more hardware processors, for facilitating cipher selection implemented by a network traffic management system comprising one or more network traffic management apparatuses, client devices, or server devices, the method comprising:

obtaining a plurality of custom cipher suite set selection rules and one or more custom priority rules via a graphical user interface (GUI), the plurality of custom cipher suite set selection rules including an intersection rule that generates an output set of cipher suites that are common to both a first cipher suite set and a second cipher suite set, wherein the first cipher suite set and the second cipher suite set are identified by using the GUI to move representations of the first and second cipher suite sets to an area associated with the intersection rule, wherein the first cipher suite set is a cipher suite set supported by a network browser, and the second cipher suite set is a standardized cipher suite set;

applying, prior to negotiating a secure network session, the plurality of custom cipher suite set selection rules to a cipher suite database, comprising a plurality of cipher suite sets including the first cipher suite set and the second cipher suite set, to generate a result set of cipher suites, and one or more of the custom priority rules to the result set of cipher suites, to generate an ordered result set of cipher suites, wherein the application of the plurality of custom cipher suite set selection rules including performing the intersection of the first cipher suite set and the second cipher suite set; and storing a cipher string, generated based on the ordered result set of cipher suites, in a secure socket layer (SSL) profile used in the negotiation of the secure network session.

2. The computer implemented method of claim 1, further comprising obtaining via the GUI a selection of each of a plurality of cipher suites and storing a custom cipher suite set comprising the selected cipher suites in the cipher suite database as a selectable one of the plurality of cipher suite sets.

3. The computer implemented method of claim 2, further comprising:
  obtaining via the GUI another cipher suite to be added to the custom cipher suite set;
  storing the another cipher suite in the cipher suite database in the one of the plurality of cipher suite sets; and
  repeating the application of the plurality of the custom cipher suite set selection rules and the one or more of the custom priority rules and the storing the cipher string.

4. The computer implemented method of claim 1, further comprising:
  determining when a failure has occurred in the application of the plurality of custom cipher suite set selection rules resulting in a null result set of cipher suites, wherein the plurality of custom cipher suite set selection rules are applied in an order; and
  outputting an indication of at least one of the plurality of custom cipher suite set selection rules that resulted in the failure, when the determination indicates that the failure has occurred in the application of the plurality of custom cipher suite set selection rules.

5. The method of claim 1, wherein the standardized cipher suite set conforms to a Federal Information Processing Standard (FIPS) cipher suite set.

6. A network traffic management apparatus, comprising memory comprising programmed instructions stored thereon and one or more processors configured to be capable of executing the stored programmed instructions to:
  obtain a plurality of custom cipher suite set selection rules and one or more custom priority rules via a graphical user interface (GUI), the plurality of custom cipher suite set selection rules including an intersection rule that generates an output set of cipher suites that are common to both a first cipher suite set and a second cipher suite set, wherein the first cipher suite set and the second cipher suite set are identified by using the GUI to move representations of the first and second cipher suite sets to an area associated with the intersection rule, wherein the first cipher suite set is a cipher suite set supported by a network browser, and the second cipher suite set is a standardized cipher suite set;
  apply, prior to negotiating a secure network session, the plurality of custom cipher suite set selection rules to a cipher suite database, comprising a plurality of cipher suite sets including the first cipher suite set and the second cipher suite set, to generate a result set of cipher suites, and one or more of the custom priority rules to the result set of cipher suites, to generate an ordered result set of cipher suites, wherein the application of the plurality of custom cipher suite set selection rules including performing the intersection of the first cipher suite set and the second cipher suite set; and
  store a cipher string, generated based on the ordered result set of cipher suites, in a secure socket layer (SSL) profile used in the negotiation of the secure network session.

7. The network traffic management apparatus of claim 6, wherein the one or more processors are further configured to be capable of executing the stored programmed instructions to obtain via the GUI a selection of each of a plurality of cipher suites and store a custom cipher suite set comprising the selected cipher suites in the cipher suite database as a selectable one of the plurality of cipher suite sets.

8. The network traffic management apparatus of claim 7, wherein the one or more processors are further configured to be capable of executing the stored programmed instructions to:
  obtain via the GUI another cipher suite to be added to the custom cipher suite set;
  store the another cipher suite in the cipher suite database in the one of the plurality of cipher suite sets; and
  repeat the application of the plurality-of the custom cipher suite set selection rules and the one or more of the custom priority rules and the storing the cipher string.

9. The network traffic management apparatus of claim 6, wherein the one or more processors are further configured to be capable of executing the stored programmed instructions to:
  determine when a failure has occurred in the application of the plurality of custom cipher suite set selection rules resulting in a null result set of cipher suites, wherein the plurality of custom cipher suite set selection rules are applied in an order; and
  output an indication of at least one of the plurality of custom cipher suite set selection rules that resulted in the failure, when the determination indicates that the failure has occurred in the application of the plurality of custom cipher suite set selection rules.

10. A non-transitory computer readable medium having stored thereon instructions for facilitating cipher selection comprising executable code that, when executed by one or more processors, causes the one or more processors to:
  obtain a plurality of custom cipher suite set selection rules and one or more custom priority rules via a graphical user interface (GUI), the plurality of custom cipher suite set selection rules including an intersection rule that generates an output set of cipher suites that are common to both a first cipher suite set and a second cipher suite set, wherein the first cipher suite set and the second cipher suite set are identified by using the GUI to move representations of the first and second cipher suite sets to an area associated with the intersection rule, wherein the first cipher suite set is a cipher suite set supported by a network browser, and the second cipher suite set is a standardized cipher suite set;
  apply, prior to negotiating, a secure network session, the plurality of custom cipher suite set selection rules to a cipher suite database, comprising a plurality of cipher suite sets including the first cipher suite set and the second cipher suite set, to generate a result set of cipher suites, and one or more of the custom priority rules to the result set of cipher suites, to generate an ordered result set of cipher suites, wherein the application of the plurality of custom cipher suite set selection rules including performing the intersection of the first cipher suite set and the second cipher suite set; and store a cipher string, generated based on the ordered result set of cipher suites, in a secure socket layer (SSL) profile used in the negotiation of the secure network session.

11. The non-transitory computer readable medium of claim 10, wherein the executable code when executed by the one or more processors further causes the one or more processors to obtain via the GUI a selection of each of a plurality of cipher suites and store a custom cipher suite set comprising the selected cipher suites in the cipher suite database as a selectable one of the plurality of cipher suite sets.

12. The non-transitory computer readable medium of claim 11, wherein the executable code when executed by the one or more processors further causes the one or more processors to: obtain via the GUI another cipher suite to be added to the custom cipher suite set; store the another cipher suite in the cipher suite database in the one of the plurality of cipher suite sets; and repeat the application of the plurality-of the custom cipher suite set selection rules and the one or more of the custom priority rules and the storing the cipher string.

13. The non-transitory computer readable medium of claim 10, wherein the executable code when executed by the one or more processors further causes the one or more processors to:

determine when a failure has occurred in the application of the plurality of custom cipher suite set selection rules resulting in a null result set of cipher suites, wherein the plurality of custom cipher suite set selection rules are applied in an order; and output an indication of at least one of the plurality of custom cipher suite set selection rules that resulted in the failure, when the determination indicates that the failure has occurred in the application of the plurality of custom cipher suite set selection rules.

14. A network traffic management system, comprising one or more traffic management apparatuses, client devices, or server devices, the network traffic management system comprising memory comprising programmed instructions stored thereon and one or more processors configured to be capable of executing the stored programmed instructions to:

obtain a plurality of custom cipher suite set selection rules and one or more custom priority rules via a graphical user interface (GUI), the plurality of custom cipher suite set selection rules including an intersection rule that generates an output set of cipher suites that are common to both a first cipher suite set and a second cipher suite set, wherein the first cipher suite set and the second cipher suite set are identified by using the GUI to move representations of the first and second cipher suite sets to an area associated with the intersection rule, wherein the first cipher suite set is a cipher suite set supported by a network browser, and the second cipher suite set is a standardized cipher suite set;

apply, prior to negotiating a secure network session, the plurality of custom cipher suite set selection rules to a cipher suite database, comprising a plurality of cipher suite sets including the first cipher suite set and the second cipher suite set, to generate a result set of cipher suites, and one or more of the custom priority rules to the result set of cipher suites, to generate an ordered result set of cipher suites, wherein the application of the plurality of custom cipher suite set selection rules including performing the intersection of the first cipher suite set and the second cipher suite set; and store a cipher string, generated based on the ordered result set of cipher suites, in a secure socket layer (SSL) profile used in the negotiation of the secure network session.

15. The network traffic management system of claim 14, wherein the one or more processors are further configured to be capable of executing the stored programmed instructions to obtain via the GUI a plurality of cipher suites and storing a custom cipher suite set comprising the plurality of cipher suites in the cipher suite database as one of the plurality of cipher suite sets.

16. The network traffic management system of claim 15, wherein the one or more processors are further configured to be capable of executing the stored programmed instructions to:

obtain via the GUI another cipher suite to be added to the custom cipher suite set;

store the another cipher suite in the cipher suite database in the one of the plurality of cipher suite sets; and repeat the application of the plurality-of the custom cipher suite set selection rules and the one or more of the custom priority rules and the storing the cipher string.

17. The network traffic management system of claim 14, wherein the one or more processors are further configured to be capable of executing the stored programmed instructions to:

determine when a failure has occurred in the application of the plurality of custom cipher suite set selection rules resulting in a null result set of cipher suites, wherein the plurality of custom cipher suite set selection rules are applied in an order; and output an indication of at least one of the plurality of custom cipher suite set selection rules that resulted in the failure, when the determination indicates that the failure has occurred in the application of the plurality of custom cipher suite set selection rules.

* * * * *